(12) United States Patent
Tabata

(10) Patent No.: US 7,402,289 B2
(45) Date of Patent: Jul. 22, 2008

(54) OZONE GENERATOR

(75) Inventor: Youichiro Tabata, Tokyo (JP)

(73) Assignee: Toshiba Mitsubishi-Electric Industrial Systems Corporation, Tokyo (JP)

( * ) Notice: Subject to any disclaimer, the term of this patent is extended or adjusted under 35 U.S.C. 154(b) by 929 days.

(21) Appl. No.: 10/758,648

(22) Filed: Jan. 16, 2004

(65) Prior Publication Data

US 2004/0223893 A1 Nov. 11, 2004

(30) Foreign Application Priority Data

May 9, 2003 (JP) .............................. 2003-131204
Sep. 30, 2003 (JP) .............................. 2003-341403

(51) Int. Cl.
*B01J 19/08* (2006.01)

(52) U.S. Cl. ................................ 422/186.07

(58) Field of Classification Search ............ 422/186.07
See application file for complete search history.

(56) References Cited

U.S. PATENT DOCUMENTS

| | | | |
|---|---|---|---|
| 5,047,127 A | 9/1991 | Tottori et al. | |
| 5,632,868 A | 5/1997 | Harada et al. | |
| 5,810,978 A | 9/1998 | Nakatsuka et al. | |
| 6,046,533 A * | 4/2000 | Nakatsuka | 313/362.1 |
| 6,391,269 B1 * | 5/2002 | Yoshimatu | 422/186.07 |
| 2006/0049738 A1 * | 3/2006 | Tabata et al. | 313/362.1 |

FOREIGN PATENT DOCUMENTS

| | | |
|---|---|---|
| JP | 55-121903 | 9/1980 |
| JP | 59-128203 | 7/1984 |
| JP | 1-282104 | 11/1989 |
| JP | 1-298003 | 12/1989 |
| JP | 3-218905 | 9/1991 |
| JP | 5-263256 | 10/1993 |
| JP | 8-59213 | 3/1996 |
| JP | 9-208202 | 8/1997 |
| JP | 11-21110 | 1/1999 |
| JP | 2002-121011 | 4/2002 |

OTHER PUBLICATIONS

Vinogradov et al., "Absorption and emission spectroscopy of barrier discharges in $N_2/NO$ and $O_2/NO$ mixtures", US DOP Rep, 1998, INIS-CZ-0010, pp. 230-234.

(Continued)

*Primary Examiner*—Kishor Mayekar
(74) *Attorney, Agent, or Firm*—Leydig, Voit & Mayer, Ltd.

(57) ABSTRACT

An ozone generator for generating ozone by applying a specified process to oxygen by discharge includes a first raw material gas supply unit for supplying the oxygen as a first raw material gas, and a second raw material gas supply unit for supplying an oxide compound gas as a second raw material gas, in which, by excited light, excited and generated by a discharge in the oxygen and the oxide compound gas, the oxide compound gas is dissociated, or the oxide compound gas is excited accelerating dissociation of the oxygen, and ozone is generated. In this way, ozone generation efficiency is raised.

7 Claims, 27 Drawing Sheets

302A: DIELECTRIC CONTAINING PHOTOCATALTIC MATERIAL SUCH AS $WO_3$, $CrO_2$, $Fe_2O_3$ OR $TiO_2$

OTHER PUBLICATIONS

I. Stefanovic, et al., "Kinetics of ozone and nitric oxides in dielectric barrier discharges in $O_2/NO_x$ and $N_2/O_2/NO_x$ mixtures", Plasma Sources Science and Technology, 2001, vol. 10, No. 3, pp. 406-416.

Okita et al., "The Characteristics of Coplanar Discharge Ozonizer by Changing Feed Gas", Institute of Electrical Engineers of Japan, Discharge Report; ED-00-108, pp. 23-28, 2000.

* cited by examiner

302A: DIELECTRIC CONTAINING $TiO_2$

302A: DIELECTRIC CONTAINING PHOTOCATALTIC MATERIAL SUCH AS $WO_3$, $CrO_2$, $Fe_2O_3$ OR $TiO_2$

302A: DIELECTRIC CONTAINING PHOTOCATALTIC MATERIAL SUCH AS $WO_3$, $CrO_2$, $Fe_2O_3$ OR $TiO_2$

OZONE GENERATOR

BACKGROUND OF THE INVENTION

1. Field of the Invention

The present invention relates to an ozone generator and an ozone generating method, and particularly to an ozone generator which includes a high voltage electrode and a low voltage electrode, causes discharge by the application of an AC voltage between them, and generates ozone gas, and an ozone generating method.

2. Description of the Related Art

In the related art, various techniques as described below have been developed.

JP-B-6-21010 discloses an ozone generator in which a raw material gas is supplied from a first raw material supply system for supplying a specified flow rate of oxygen from an oxide cylinder with a purity of 99.995% or more, and from a second raw material supply system for supplying a specified flow rate of second raw material gas (nitrogen, helium, argon, or carbon dioxide) with a purity of 99.99% or more, a high AC voltage is applied between electrodes to cause silent discharge (dielectric barrier discharge) through a dielectric between the electrodes, and the raw material gas is transformed into an ozone gas. The publication discloses that although the cause of a time-varying reduction phenomenon of ozone concentration is not clear, the time-varying reduction phenomenon exists in the ozone gas once generated by the ozone generator under high purity oxygen, and as means for suppressing the time-varying reduction, it is effective to add a nitrogen gas or the like to the high purity oxygen.

Japanese Patent No. 2641956 discloses that a mixture ratio of an oxygen gas as a raw material gas of an ozonizer to a nitrogen gas is set in a range of 1:0.0002. (200 ppm) to 0.0033 (3300 ppm). Besides, FIG. 2 of Japanese Patent No. 2641956 shows a characteristic of the quantity of addition of nitrogen gas and the concentration of ozone obtained by the ozonizer, and as the quantity of addition of nitrogen at which sufficient ozone concentration (about 100 g/m³ or more) is obtained, the mixture ratio is set to 1:0.0002. In order to suppress the quantity of generation of nitrogen oxide as a reaction poisonous substance from the ozonizer to be small, the mixture ratio is set to 1:0.0033 or less. The publication discloses that when the oxygen raw material gas in which the quantity of addition of nitrogen is 100 ppm or less is used, the ozone concentration of 20 g/m³ (9333 ppm) is merely obtained, which is ⅙ or less of the ozone concentration of 120 g/m³ (56000 ppm) at the time when the quantity of addition of nitrogen is 3300 ppm. Besides, in the specification, it is disclosed that although an argon gas instead of the nitrogen gas is added to the high purity oxygen, the ozone concentration of about 20 g/m³ (9333 ppm) is merely obtained independent of an argon mixture ratio, and the argon gas does not have an effect to raise the ozone concentration.

Besides, JP-A-11-21110 discloses an ozone generator in which a TiO$_2$ film is formed on a discharge surface of a dielectric. Instead of the addition of high purity nitrogen gas, the discharge surface of the dielectric in the generator is coated with titanium oxide having a metal element ratio of 10 wt % or more. It is disclosed that when the material gas is supplied and the ozone gas is generated in this generator, the time-varying reduction of ozone concentration can be prevented by the photocatalytic action of TiO$_2$. In the case where a nitrogen gas is added to high purity oxygen to stably generate ozone, nitrogen oxide (NOx) as a reaction poisonous substance is generated as a by-product of the ozone gas by silent discharge. However, it is pointed out that as means for preventing the generation thereof, the coating of the titanium oxide is effective.

Further, Japanese Patent No. 2587860 proposes that in an ozonizer which can obtain a maximum ozone concentration of 180 g/m³, the quantity of addition of nitrogen is made 0.01% to 0.5% in order to suppress the time-varying reduction of ozone concentration.

In the related art, with respect to the mechanism of generating the ozone gas by silent discharge, it is said that the ozone gas is generated by following reaction equations.

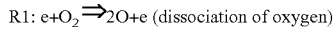

R1: $e + O_2 \Rightarrow 2O + e$ (dissociation of oxygen)

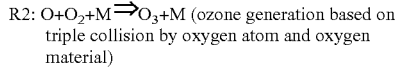

R2: $O + O_2 + M \Rightarrow O_3 + M$ (ozone generation based on triple collision by oxygen atom and oxygen material)

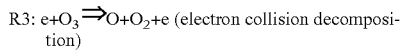

R3: $e + O_3 \Rightarrow O + O_2 + e$ (electron collision decomposition)

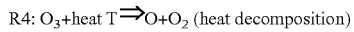

R4: $O_3 + heat\ T \Rightarrow O + O_2$ (heat decomposition)

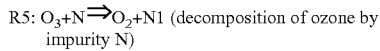

R5: $O_3 + N \Rightarrow O_2 + N1$ (decomposition of ozone by impurity N)

Incidentally, N1 denotes an impurity different from N.

The generation of the ozone gas is such that the oxygen molecule is dissociated to the oxygen atoms in R1, and the ozone is generated based on the triple collision by the oxygen atom and the oxygen material in R2.

As the decomposition of the generated ozone, the electron collision decomposition of R3, the heat decomposition of R4, the decomposition of ozone by the impurity of R5, or the like is conceivable.

As the ozone gas which can be extracted from the generator, the ozone gas is obtained according to the balance state of the reaction equations of R1 to R5. That is, the ozone gas can be extracted by a following equation.

extractable ozone=$(R1*R2)-(R3+R4+R5+\ldots)$.

Besides, in the related art, in the case of the high purity oxygen, with respect to the ozone generated by the ozone generation mechanism, since the ozone concentration is reduced with the passage of time during the operation, the nitrogen gas is added to the raw material gas, or TiO$_2$ as the photocatalyst is applied to the discharge electrode surface, so that a following reaction occurs, and the time-varying reduction of the ozone concentration is prevented.

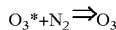

$O_3* + N_2 \Rightarrow O_3$

$O_3* + TiO_2 \Rightarrow O_3$

JP-B-6-21010, Japanese Patent No. 2641956, and JP-A-11-21110 are for stably obtaining the ozone concentration at a relatively low ozone concentration of about 120 g/m³.

Besides, Japanese Patent No. 2587860 discloses to obtain an ozone concentration of about 180 g/m³ or less.

Incidentally, in the respective related art, different phenomena as described below are described.

Although JP-B-6-21010 discloses that a gas of helium, argon, or carbon dioxide is also effective as a gas other than the nitrogen gas, Japanese Patent No. 2641956 discloses that in the case of the high purity oxygen, the argon gas is not effective.

Although JP-B-6-21010 discloses that the quantity of addition of the second raw material gas is made 10000 ppm to 100000 ppm, Japanese Patent No. 2641956 discloses 200 ppm to 3300 ppm which is different from the former.

JP-B-6-21010 discloses that in the high purity oxygen, the concentration is reduced by the operation for about one hour, while JP-A-11-21110 discloses the concentration reduction after the operation for about 7 hours, which is different from the former.

As described above, in the related art in which the nitrogen gas or the like is added to the ozone generated by the apparatus in order to suppress the time-varying reduction of the ozone concentration, the results and effects vary according to the conditions, and although experimental confirmation was made for JP-B-6-21010, Japanese Patent No. 2641956 and JP-A-11-21110, JP-B-6-21010 and JP-A-11-21110 could not be substantiated, and it turned out that addition of a separate noble gas (helium, neon, argon, xenon, etc.) other than nitrogen was ineffective.

Both JP-B-6-21010 and Japanese Patent No. 2587860 disclose that the reduction of the ozone concentration is the time-varying reduction, however, it is disclosed that when the concentration is once reduced, it does not return to the original ozone concentration. From the recitation that the concentration does not return to the original ozone concentration, it can not be judged that the concentration reduction is the time-varying reduction, and the role of the addition of nitrogen is not clear.

Further, it turned out that when the nitrogen was added at an additive rate of approximately 0.15% (1500 ppm) or more, in addition to the ozone gas, a large quantity of NOx by-product gas such as $N_2O_5$ or $N_2O$ was generated by the silent discharge.

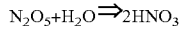

$N_2O_5 + H_2O \Rightarrow 2HNO_3$

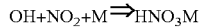

$OH + NO_2 + M \Rightarrow HNO_3 M$

Besides, when a large quantity of NOx by-product is generated, a nitric acid ($HNO_3$) cluster (vapor) is generated by the reaction of the NOx gas component and moisture contained in the raw material gas, and the ozonized gas is extracted in such a state that a trace quantity of NOx gas and nitric acid cluster, together with oxygen and ozone gas, are mixed. When the quantity of the trace quantity of nitric acid cluster contained is several hundred ppm or more, there are problems that rust of chromium oxide or the like is deposited by nitric acid on the inner surface of a stainless pipe as an ozone gas outlet pipe, a metal impurity is mixed into a clean ozone gas, the metal impurity as a reaction gas for a semiconductor manufacturing apparatus has a bad influence on the manufacture of a semiconductor, and the trace quantity of the generated nitric acid cluster has a bad influence as a reaction poisonous substance on "an etching process of a silicon oxide film by ozone" or "ozone water washing of a wafer or the like" of a semiconductor manufacturing apparatus.

In the ozone apparatus of the related art, the concentration of the extracted ozone is low, and in order to extract ozone with a high concentration of 200 g/m³ or more, there is only a method of increasing the nitrogen additive rate or a method of decreasing the gas flow rate In the method of increasing the nitrogen additive rate, as described above, there is a problem that the by-product gas of NOx is increased.

Besides, when the gas flow rate is decreased, there are problems that the quantity of ozone generation is extremely lowered, and production efficiency on the side of using the ozone becomes worse.

Further, in the newest "etching apparatus of an oxide film by ozone" or "ozone water washing of a wafer or the like", a high ozone concentration of 200 g/m³ or more is needed, and with respect to the quantity of ozone generation, there is a request for an ozone apparatus having an ozone capacity of several tens g/h or more on an economically viable basis in production on the user side, and further, in a semiconductor manufacturing apparatus, an apparatus producing less reaction poisonous material such as nitric acid has been-needed.

Besides, although a trace quantity, about 1%, of $N_2$ gas is added in order to increase the generation efficiency of an ozone gas, the $N_2$ gas is transformed into NOx or nitric acid cluster by discharge in the generator.

Thus, there are problems that in the discharge space, as the gas flow velocity becomes low, or the injected discharge power becomes high, the quantity of addition of nitrogen is decreased at the downstream part of the discharge space, a large quantity of NOx and nitric acid cluster are generated, the ozone generation efficiency is lowered, and the concentration of the extracted ozone is reduced.

SUMMARY OF THE INVENTION

The invention has been made to solve the foregoing problems, and an object thereof is to provide an ozone generator which can adequately raise an ozone generation efficiency.

An ozone generator of the invention includes, in an ozone generator for generating ozone by applying a specified process to an oxygen gas by discharge, a first raw material gas supply unit for supplying the oxygen gas as a first raw material gas, and a second raw material gas supply unit for supplying an oxide compound gas as a second raw material gas, in which by excited light excited and generated by the discharge under existence of the oxygen gas and the oxide compound gas, the oxide compound gas is dissociated, or the oxide compound gas is excited to have an accelerating action of dissociation of the oxygen gas, so that the ozone is generated.

According to the ozone generator of the invention, the ozone generation efficiency can be adequately raised. Especially, when a nitrogen dioxide gas is used as the oxide compound gas, as compared with a nitrogen gas, the ozone generation efficiency becomes high, and as a result, the quantity of generation of NOx by-product can be decreased.

Besides, an ozone generator of the invention includes a first electrode, a second electrode facing the first electrode to form a discharge area, a first raw material gas supply unit for supplying an oxygen gas as a first raw material gas, a second raw material gas supply unit for supplying a second raw material gas as an oxide compound gas or capable of generating an oxide compound gas, and a third raw material gas supply unit for supplying a third raw material gas which is excited by discharge and generates excited light to dissociate the oxide compound gas or to excite the oxide compound gas to accelerate dissociation of the oxygen gas, wherein an AC voltage is applied between the first electrode and the second electrode from a power supply to inject discharge power to the discharge area, specified quantities of the raw material gases by the first to the third raw material gas supply units are supplied to a space where the discharge is generated between gaps of the discharge area, and an ozone gas is generated.

According to the ozone generator of the invention, since the third raw material gas is used which is excited by the discharge and generates the excited light to dissociate the oxide compound gas or to excite the oxide compound gas to accelerate the dissociation of the oxygen gas, the ozone generation efficiency can be adequately raised.

Besides, an ozone generator of the invention includes a first electrode, a second electrode facing the first electrode to form a discharge area, a first raw material gas supply unit for supplying an oxygen gas as a first raw material gas, a photocatalytic material provided on a dielectric in the discharge area or on the electrode and for absorbing light in a specified wavelength range or a material transformed into a photocatalyst by discharge, and a third raw material gas supply unit for supplying a third raw material gas which is excited by the discharge and generates excited light to excite the photocatalytic material to accelerate dissociation of the oxygen gas, wherein an AC voltage is applied between the first electrode and the second electrode from a power supply to inject discharge power to the discharge area, specified quantities of the raw material gases by the first and the third raw material gas supply units are supplied to a space where the discharge is generated between gaps of the discharge area, and an ozone gas is generated.

According to the ozone generator of the invention, since the photocatalytic material or the material transformed into the photocatalyst is used, the ozone generation efficiency can be adequately raised.

Further, an ozone generator of the invention includes a first electrode, a second electrode facing the first electrode to form a discharge area, a first raw material gas supply unit for supplying an oxygen gas as a first raw material gas, a photocatalytic material provided on a dielectric in the discharge area or on the electrode and for absorbing light in a specified wavelength range or a material transformed into a photocatalyst by discharge, a second raw material gas supply unit for supplying a second raw material gas as an oxide compound gas or capable of generating an oxide compound gas, and a third raw material gas supply unit for supplying a third raw material gas which is excited by the discharge and generates excited light to excite the photocatalytic material and the oxide compound gas to generate an oxygen atom, wherein an AC voltage is applied between the first electrode and the second electrode from a power supply to inject discharge power to the discharge area, specified quantities of the raw material gases by the first to the third raw material gas supply units are supplied to a space where the discharge is generated between gaps of the discharge area, and an ozone gas is generated.

According to the ozone generator of the invention, the ozone generation efficiency can be adequately raised. Especially, since the photocatltic material or the material transformed into the photocatalyst is used, and the oxide compound gas (second raw material gas) is added to the raw material gas, the oxide compound gas itself has the capacity to generate the ozone, and the ozone can be more stably generated, and the apparatus having a long lifetime can be obtained.

The foregoing and other objects, features, aspects and advantages of the present invention will become more apparent from the following detailed description of the present invention when taken in conjunction with the accompanying drawings.

DETAILED DESCRIPTION OF THE INVENTION

Embodiment 1

Figure 1:
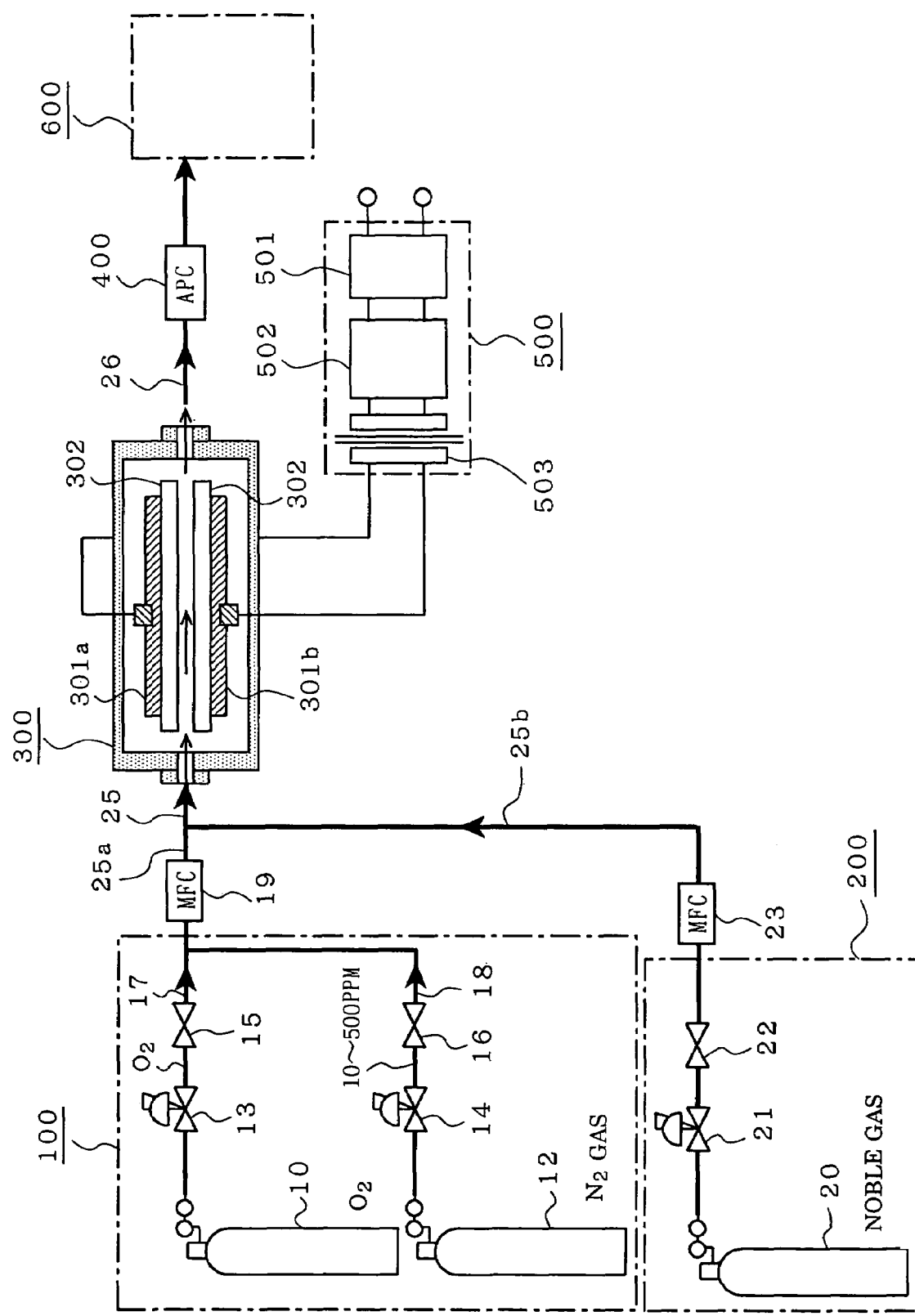
FIG. 1 is a gas system view showing an ozone generator in embodiment 1 of the invention.
Figure 2:
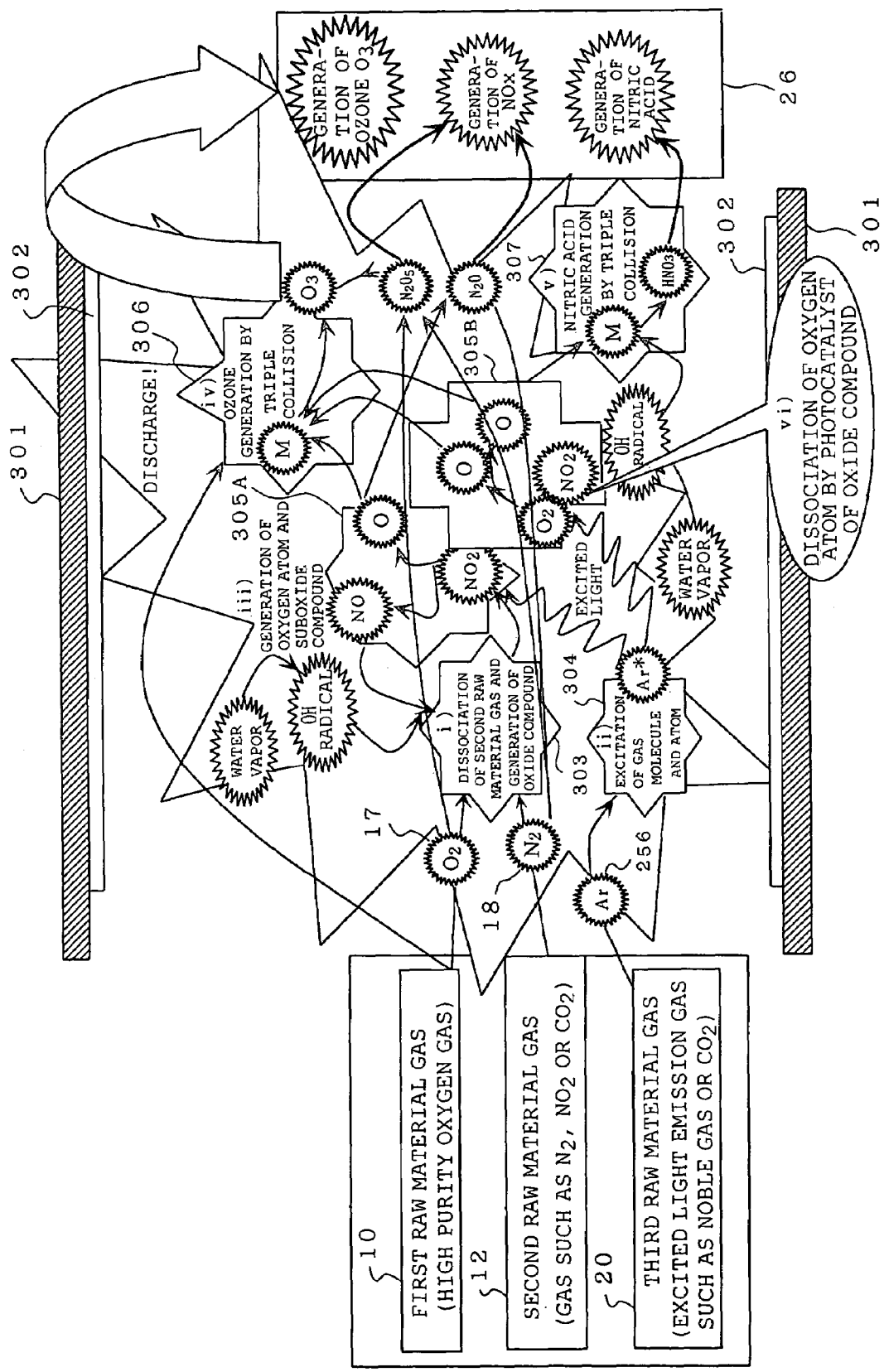
FIG. 2 is a schematic view showing an ozone generation mechanism in the embodiment 1.

Embodiment 1 of this invention will be described with reference to FIGS. 1 to 8. FIG. 1 is a block diagram showing a structure of a gas system in the embodiment 1. FIG. 2 is a schematic view showing an ozone generation mechanism in the embodiment 1. FIGS. 3 to 8 are diagrams showing ozone concentration characteristics in the embodiment 1.

An ozone generator of this invention is effective when used in a case requiring a high concentration ozone gas of 200 g/m³ or more, a clean ozone gas as in a semiconductor manufacturing apparatus or a washing apparatus, an ozone gas in which a by-product such as NOx is suppressed, or an apparatus having a high ozone generation efficiency.

In FIG. 1, a type A raw material supply system 100 for supplying a gas in which oxygen (first raw material gas) having a purity of 99.99% is mixed with a trace quantity of nitrogen or nitrogen dioxide $N_2O_4$ ($NO_2$) (second raw material gas), is constituted by a high purity oxygen cylinder 10, a nitrogen or oxide compound gas (second raw material gas) cylinder 12, pressure reducing valves 13 and 14 for the respective cylinders, and open/close valves 15 and 16, and a second raw material gas 18 of 5 ppm was supplied to an oxygen gas 17.

A type B raw material supply system 200 for supplying a specified quantity of third raw material gas having a purity of 99.99% or more is constituted by a high purity noble gas cylinder 20, a pressure reducing valve 21, and an open/close valve 22, and a third raw material gas 25b of 500 ppm or more was supplied to the oxygen gas 17.

A raw material gas 25 is supplied to an ozone generator 300 through a flow controller (MFC) 19 for controlling the gas quantities of the first raw material gas and the second raw material gas and a flow controller (MFC) 23 for controlling the quantity of the third raw material gas.

The ozone generator 300 is provided with electrodes 301a and 301b and dielectrics 302. The ozone generator 300 is designed such that the raw material gas 25 is supplied from the type A raw material supply system and the type B raw material supply system, is transformed into an ozone gas 26, and is outputted to the outside through a pressure controller (APC) 400.

An ozone power supply 500 for generating ozone in the ozone generator 300 is mainly constituted by a converter part 501, an inverter part 502 and a transformer part 503, and applies a high AC voltage between the electrodes 301a and 301b of the ozone generator 300 to generate silent discharge (dielectric barrier discharge) through the dielectric between the electrodes, and the raw material gas is transformed into the ozone gas.

Besides, although the ozone generator 300 includes a cooling unit using water or the like for cooling the electrodes, here, the cooling unit is omitted in the illustration.

A discharge power of up to about 2000 W is injected from the ozone power supply to the ozone generator 300 of a type in which a both-sided electrode can be cooled and which is constructed with a gap length of 0.1 mm and a discharge area of about 750 cm², and the raw material gas 25 to be injected to the ozone generator 300 is prepared such that the noble gas, such as argon, or the carbon dioxide gas 25b is added from the third raw material gas cylinder 20 to the raw material gas 25a in which the nitrogen or nitrogen dioxide $NO_2$ gas 18 of 5 ppm as the second raw material gas is mixed to the oxygen gas 17 (first raw material gas) having a purity of 99.99% or more. The ozone concentration characteristic with respect to the nitrogen additive rate under the above condition was measured.

In the above setting condition of the generator, as an allowable performance evaluation standard, the following design standard is set.

To be capable of extracting the ozone gas with an ozone concentration C of 200 g/m³ (93333 ppm) or more by a discharge power of 2 kw and a raw material gas of 10 L/min.

That is, to be capable of obtaining an ozone generation quantity Y (g/h) of 120 g/h or more under the above condition.

For that purpose, an actually extracted ozone yield X (g/kWh) is need to be a value mentioned below or more.

$$X = (120 \text{ g/h})/(2 \text{ kW}) = 60 \text{ g/kWh}$$

When the ratio of an ozone yield Xo of the ozone generator itself to the actually extracted ozone yield X is made 50%, the ozone yield Xo of the ozone generator itself is need to be 120 g/kWh or more.

For that purpose, an ozone generation efficiency η (mg/J) is calculated as follows.

$$\eta = (120 \text{ g/kWh})/(60 \cdot 60S)/1000$$
$$= 0.033 \text{ (mg/J)}$$

The ozone generation efficiency η of 0.033 mg/J or more is needed.

This value is made an allowable standard of one apparatus, and is made a selection standard of an ozone generator and a raw material gas.

Figure 28:
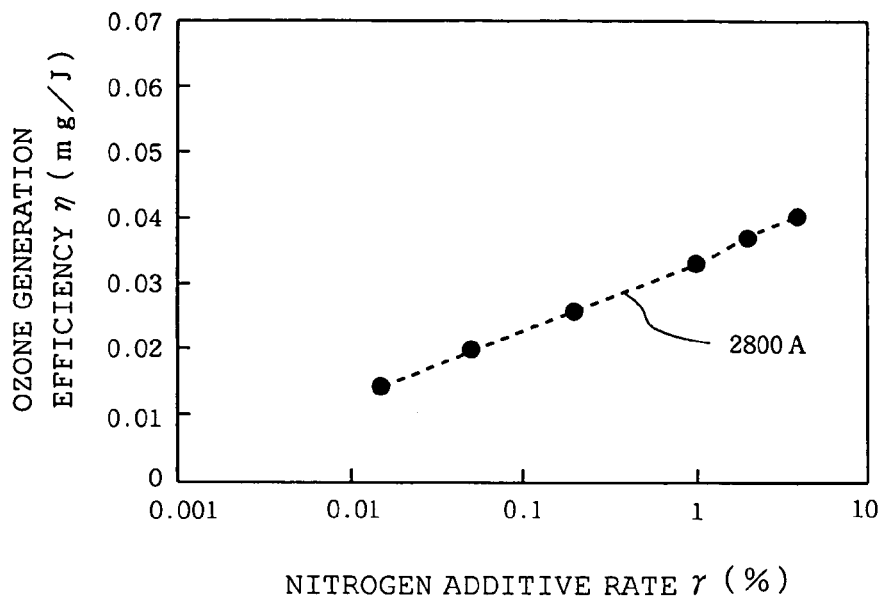
FIG. 28 is a characteristic diagram showing a characteristic of an ozone generation efficiency $\eta$ (mg/J) with respect to a nitrogen additive rate $\gamma$ in this invention.

In the case where a nitrogen dioxide $NO_2$ gas is not mixed, in order to satisfy the condition of the ozone generation efficiency η of 0.033 to 0.035 mg/J or more, the nitrogen additive rate γ of about 1.5% or more is needed as indicated by a characteristic 2800A of FIG. 28.

Figure 3:
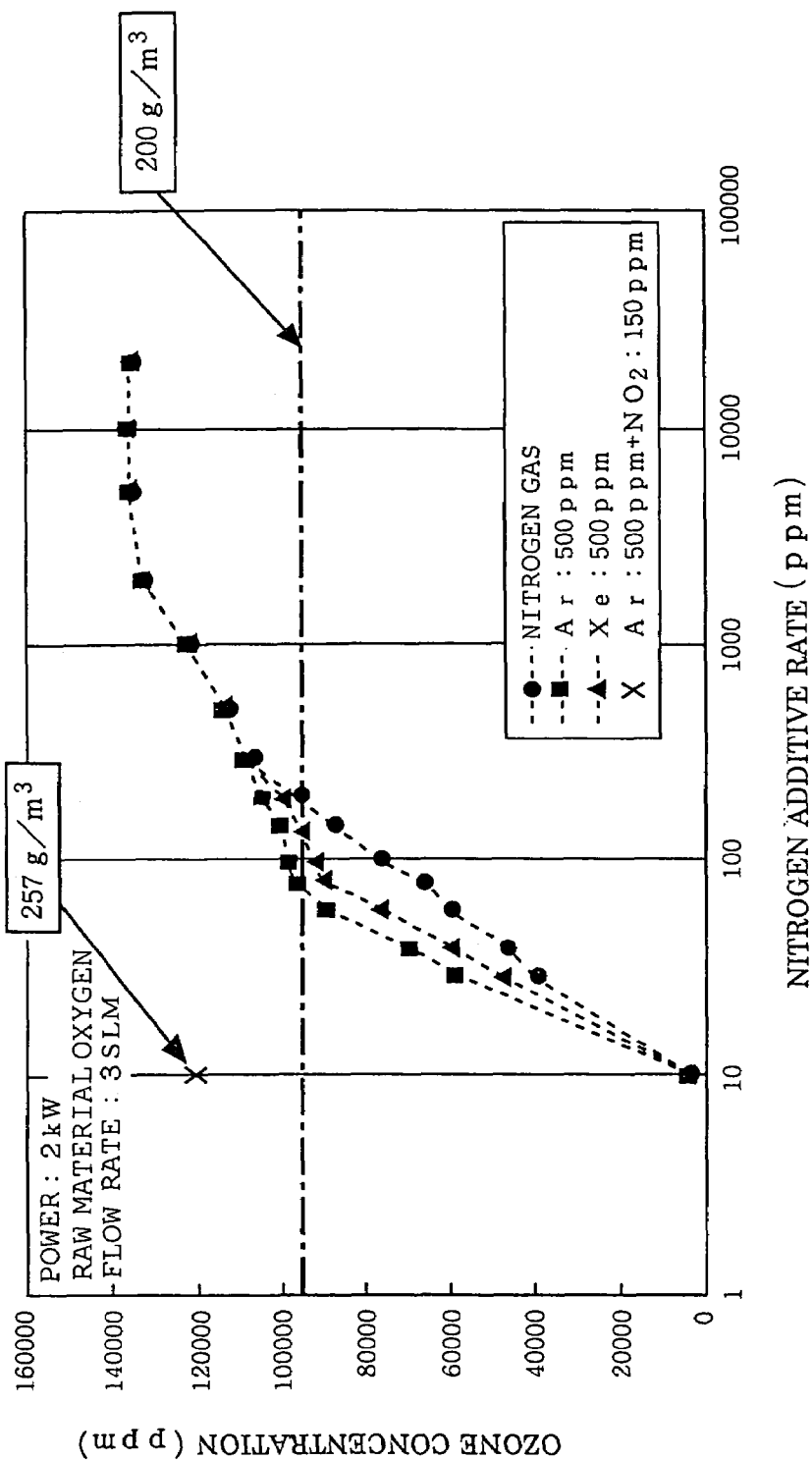
FIG. 3 is a characteristic diagram showing an ozone concentration characteristic in the embodiment 1.

On the other hand, it has been understood that as shown in FIG. 3, when a noble gas, such as argon or xenon, of 500 ppm as the third raw material gas is added to high purity oxygen of 3 SLM, and nitrogen of approximately 10 ppm to 500 ppm is added, the ozone generation efficiency with respect to the nitrogen additive rate γ is increased, and the ozone concentration equal to or higher than the ozone concentration characteristic of the case where only nitrogen gas is added, can be extracted (incidentally, the unit "SLM" means standard L/min, and indicates L/m at 20° C.)

Besides, it has been understood that when nitrogen dioxide instead of the nitrogen gas of the second raw material gas is added, and argon gas of 500 ppm or more is added, the ozone generation efficiency η is increased, and ozone with a high concentration of 200 g/m³ or more can be obtained.

As a result, the generation quantity of NOx, such as $N_2O_5$ or NO, as the by-product by the discharge is lowered, a nitric acid ($HNO_3$) cluster by the bonding of NOx and moisture can be decreased, and the generation quantity of metal impurity by the stainless metal surface of an ozone outlet pipe part and nitric acid is lowered.

Figure 4:
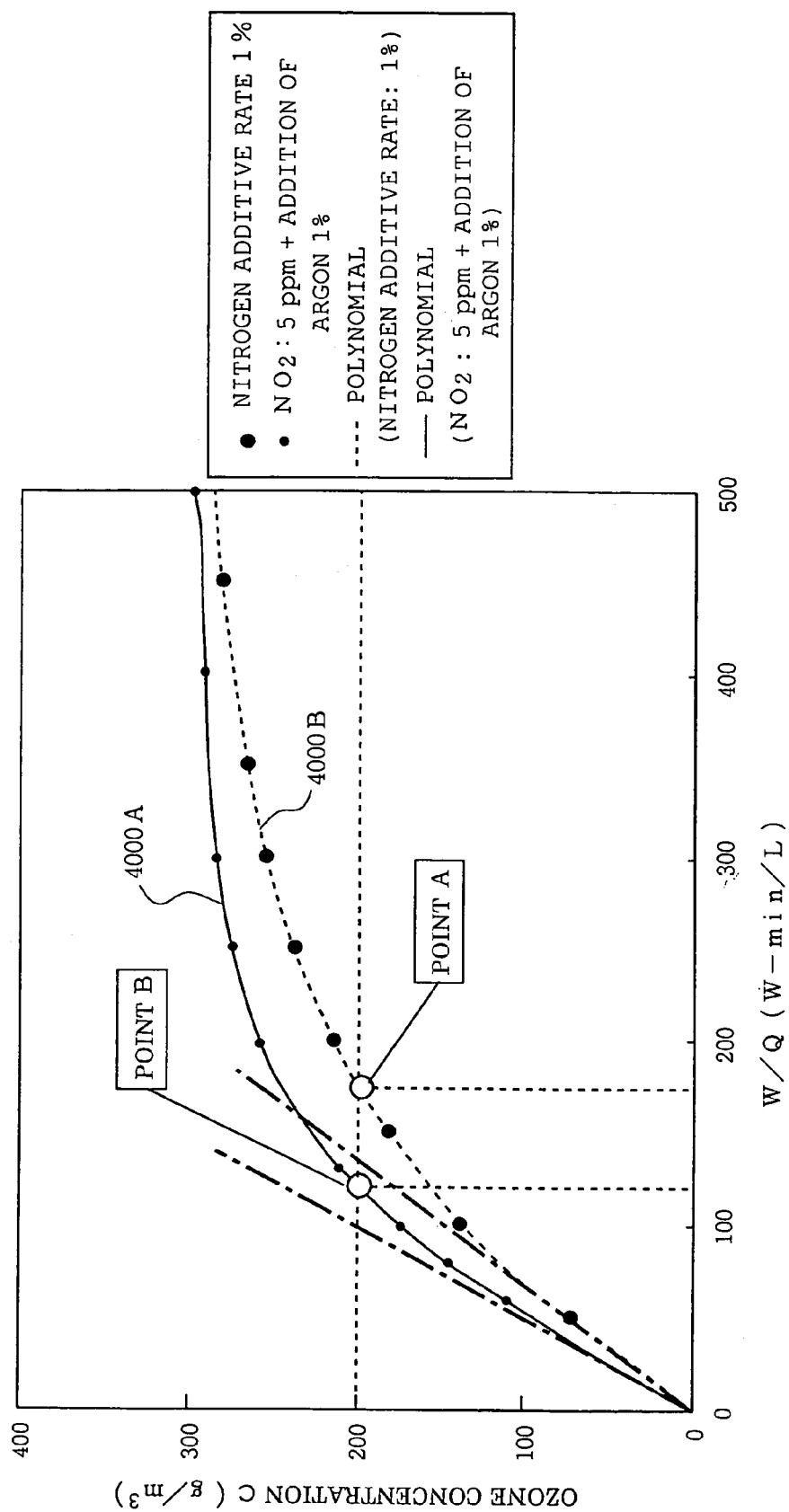
FIG. 4 is a characteristic diagram showing an ozone concentration characteristic in the embodiment 1.

FIG. 4 shows an ozone concentration characteristic in a case where a raw material gas is prepared by adding nitrogen dioxide of 5 ppm as the second raw material gas to the oxygen gas, and by adding an argon gas of 1% as the third raw material gas.

FIG. 4 shows the ozone concentration characteristic with respect to a discharge power W/Q injected per unit flow rate, and a characteristic 4000A indicates a characteristic in a case where $NO_2$ of 5 ppm and argon gas of 1% are added. Besides, a characteristic 4000B of a broken line indicates a characteristic in a case where a nitrogen additive rate is 1%. In the characteristic 4000A, when an oxide compound gas instead of nitrogen is mixed from the first, and the argon gas of about 1% instead of the nitrogen gas is added, a tangential line as an ozone generation efficiency η becomes large, and the ozone concentration characteristic can be improved. However, the final ozone concentration is eventually saturated at 300 g/m³, irrespective of a gaseous species.

Besides, in order to raise the final ozone concentration, when the electrode temperature of the ozone generator is lowered from 20° C. to 10° C. and 5° C. ozone with a high concentration of 350 g/m$^3$ and 400 g/m$^3$ can be extracted.

In the drawing, a point A indicates that the W/Q value at which ozone of 200 g/m$^3$ is obtained in a case of nitrogen addition quantity of 1%, is required to be 175 or more, and a point B indicates that the W/Q value at which ozone of 200 g/m$^3$ is obtained in a case of NO$_2$ of 5 ppm and Ar of 1%, is required to be 120 or more.

That is, when the gas flow rate is constant, in the case of NO$_2$ of 5 ppm and Ar of 1%, the discharge power becomes 0.69 (=120/175) times as high as that of the case of N$_2$ of 1%, the output voltage, current and power of the power supply are decreased, the ozone generator and the power supply become compact, and the ozone efficiency is also increased.

Figure 5:
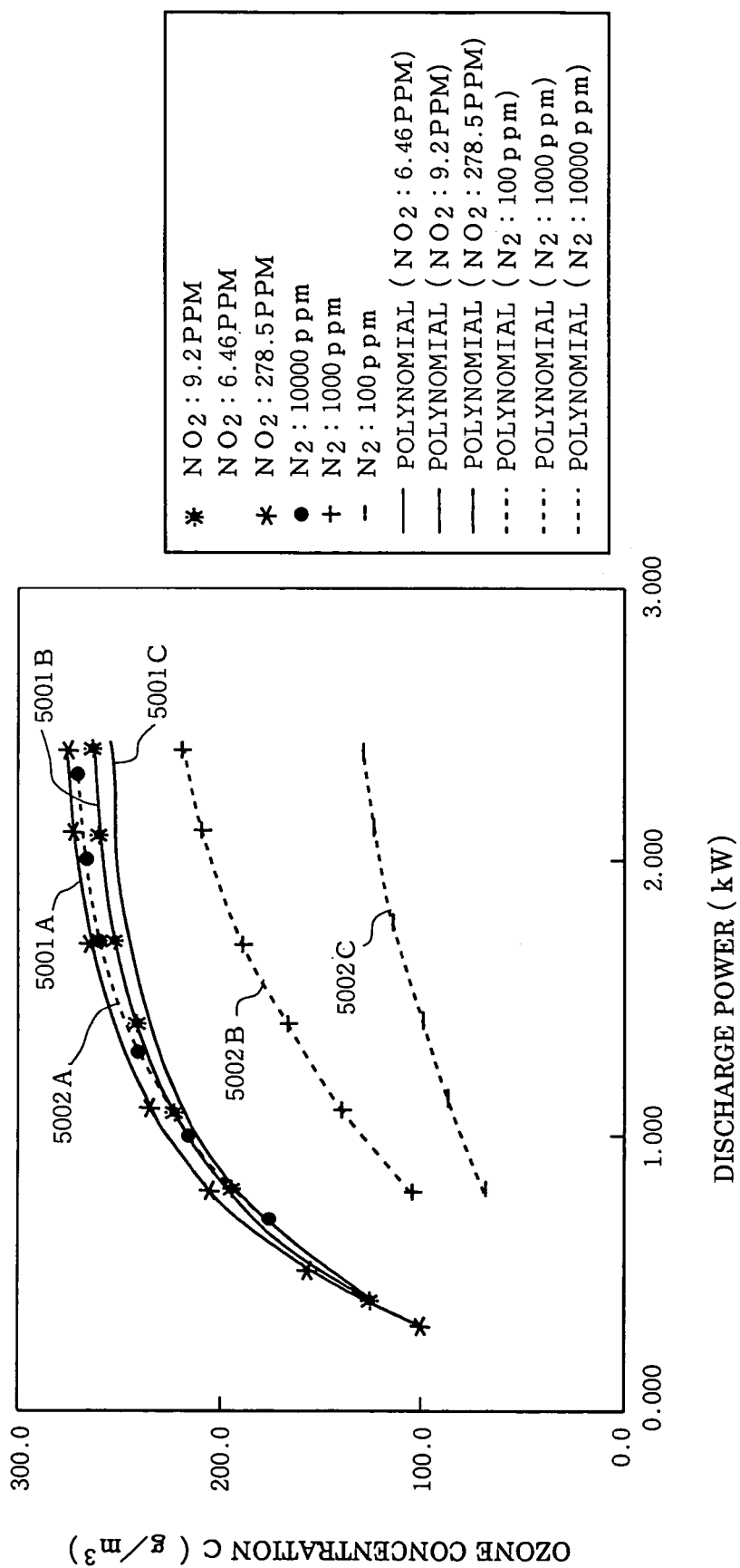
FIG. 5 is a characteristic diagram showing an ozone concentration characteristic in the embodiment 1.
Figure 6:
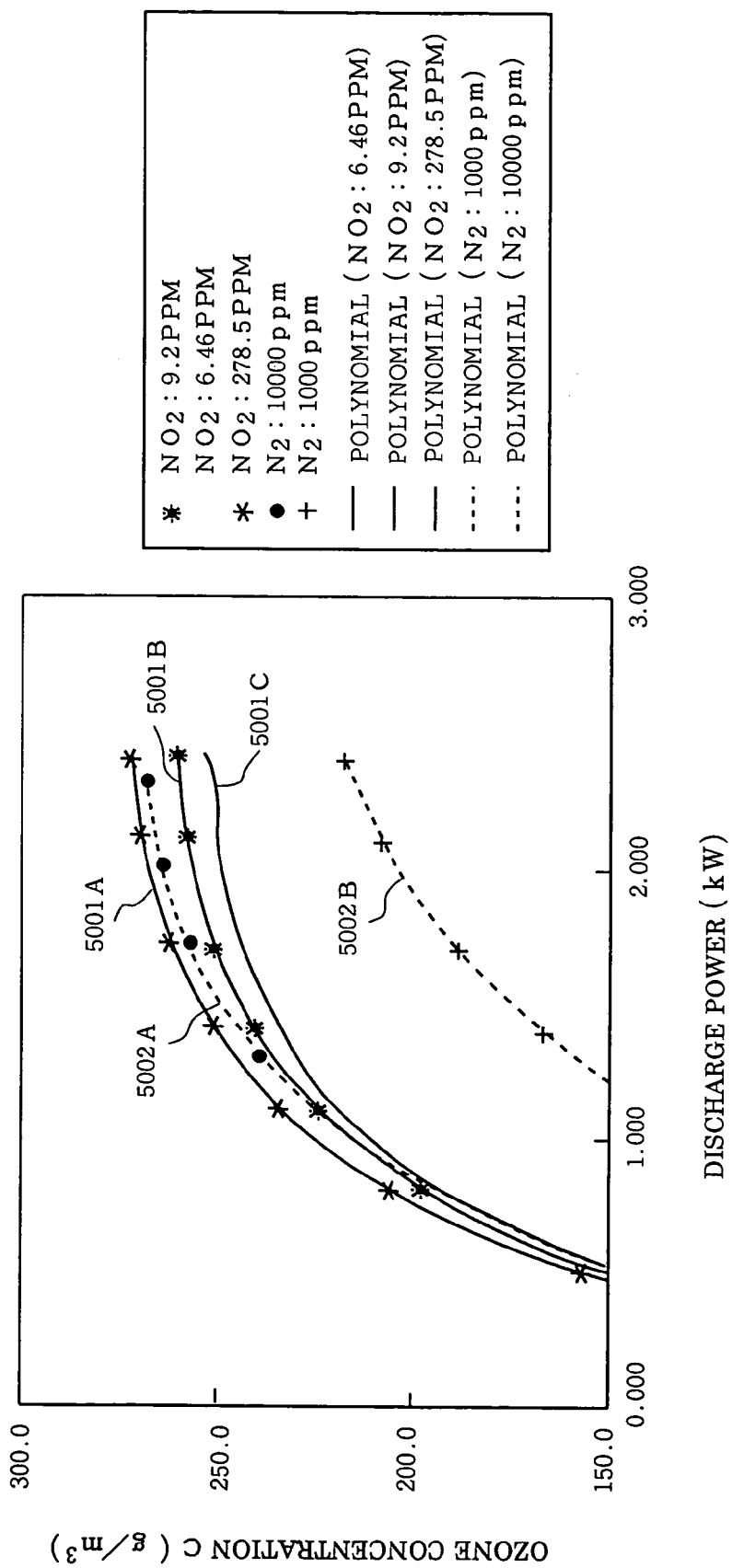
FIG. 6 is a characteristic diagram showing an ozone concentration characteristic in the embodiment 1 and is an enlarged characteristic diagram of FIG. 5.

FIGS. 5 and 6 show ozone concentration characteristics in a case where a raw material gas is prepared by adding nitrogen dioxide to an oxygen gas, and a case where a raw material gas is prepared by adding nitrogen gas to an oxygen gas. The drawings show the respective ozone concentration characteristics with respect to discharge power W/Q injected per unit flow rate. In the case where the nitrogen dioxide is added, the drawings show the characteristics in the cases where nitrogen dioxide of 278 ppm (characteristic 5001A), 9.2 ppm (characteristic 5001B) and 6.4 ppm (characteristic 5001C) are added to the oxygen gas. Besides, a characteristic 5002A, a characteristic 5002B and a characteristic 5002C of broken lines indicate the characteristics in the cases where nitrogen of 10000 ppm, 1000 ppm and 100 ppm are added. FIG. 6 is a view enlarging the ozone concentration characteristics of FIG. 5. From the drawings, it has been turned out that when the nitrogen dioxide of several ppm is added, performance equivalent to the case where the nitrogen gas of 1% (10000 ppm) is added can be obtained, and the ozone concentration of 200 g/m$^3$ or more can be secured.

From the results of FIGS. 5 and 6 of this text, the performance equivalent to the maximum ozone concentration characteristic of the case where nitrogen is added can be obtained by merely adding the trace quantity of nitrogen dioxide, and therefore, it has been found that the generation of ozone is caused by the nitrogen dioxide more strongly than the nitrogen gas.

Besides, since ozone with an ozone concentration of 200 g/m$^3$ (140000 ppm) is generated by addition of nitrogen dioxide of several ppm, an ozone generation magnification of the nitrogen dioxide is a factor of hundreds of thousands [=(140000 ppm of ozone)/(1 ppm of nitrogen dioxide)] and the ozone can be generated at the extremely high magnification, and therefore, it has been found that the nitrogen dioxide functions as a catalyst for the ozone generation.

Besides, when the ozone generation characteristic in the case of the nitrogen addition is compared with that in the case of the nitrogen dioxide addition, the nitrogen dioxide has a capacity about 10000 times as the ozone generation capacity of the nitrogen gas.

In FIG. 6, when the ozone concentration characteristic (5002A) of the case where nitrogen with an additive rate of 1% (10000 ppm) is added, is compared with the ozone concentration characteristics (5001A), (5001B) and (5001C) of the cases where nitrogen dioxides of 278 ppm, 9.2 ppm and 6.4 ppm are added, as the discharge power becomes low, the characteristic 5002A of the nitrogen addition approaches the characteristic (5001C) of the case of the nitrogen dioxide of 6.4 PPM.

From these measurement facts, it can be ascertained that the ozone generation capacity of the nitrogen gas is not obtained by the nitrogen itself, the nitrogen gas is dissociated by silent discharge, and the nitrogen dioxide is generated so that the ozone is generated.

Figure 8:
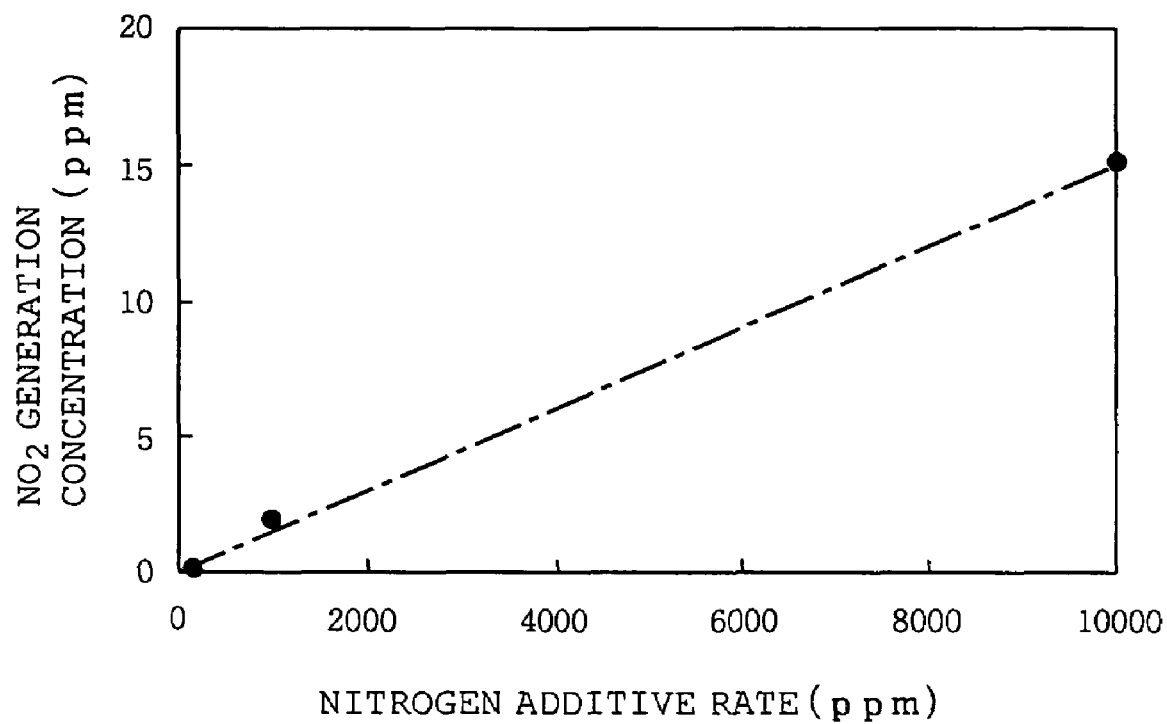
FIG. 8 is a characteristic diagram showing a generation ratio of nitrogen dioxide by discharge in a case where a nitrogen gas is added in the embodiment 1.

FIG. 8 shows the generation quantity of the nitrogen dioxide by discharge in the case where the nitrogen gas is added, which is obtained by performing the inverse operation from the ozone performance characteristic under the condition of a discharge power of 2.1 kW. From FIG. 8, it has been clarified that the generation quantity is about 15 ppm at the discharge power of 2.1 kW.

Figure 7A:
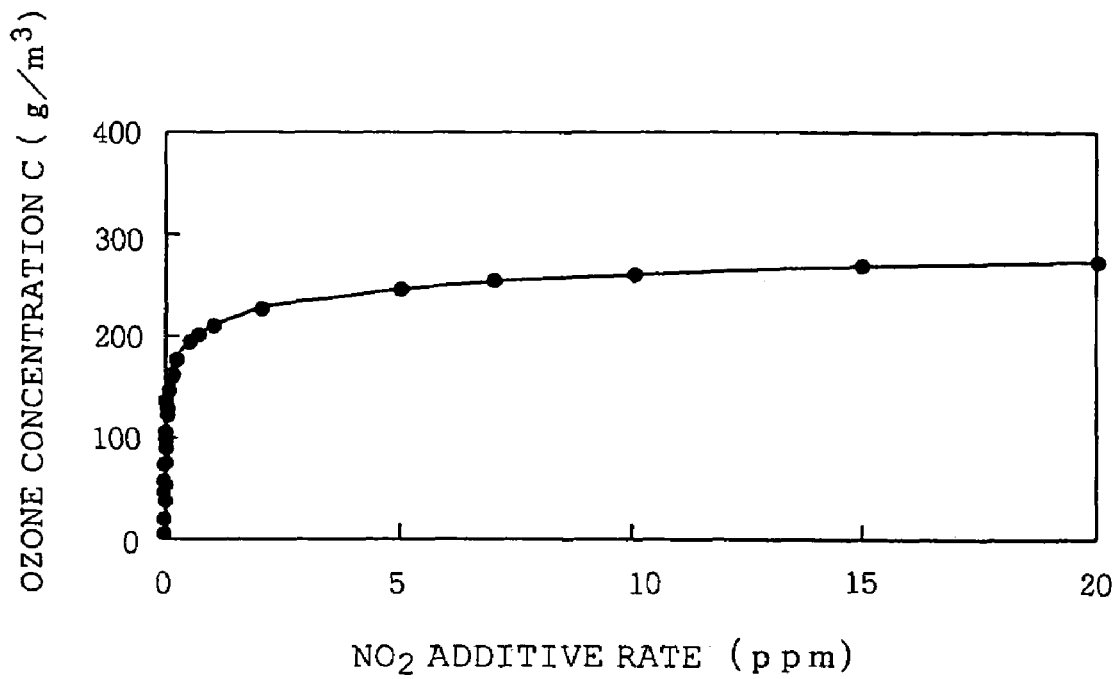
FIGS. 7A and 7B are characteristic diagrams showing a relation of a concentration of generated ozone with respect to an additive rate of nitrogen dioxide in the embodiment 1.
Figure 7B:
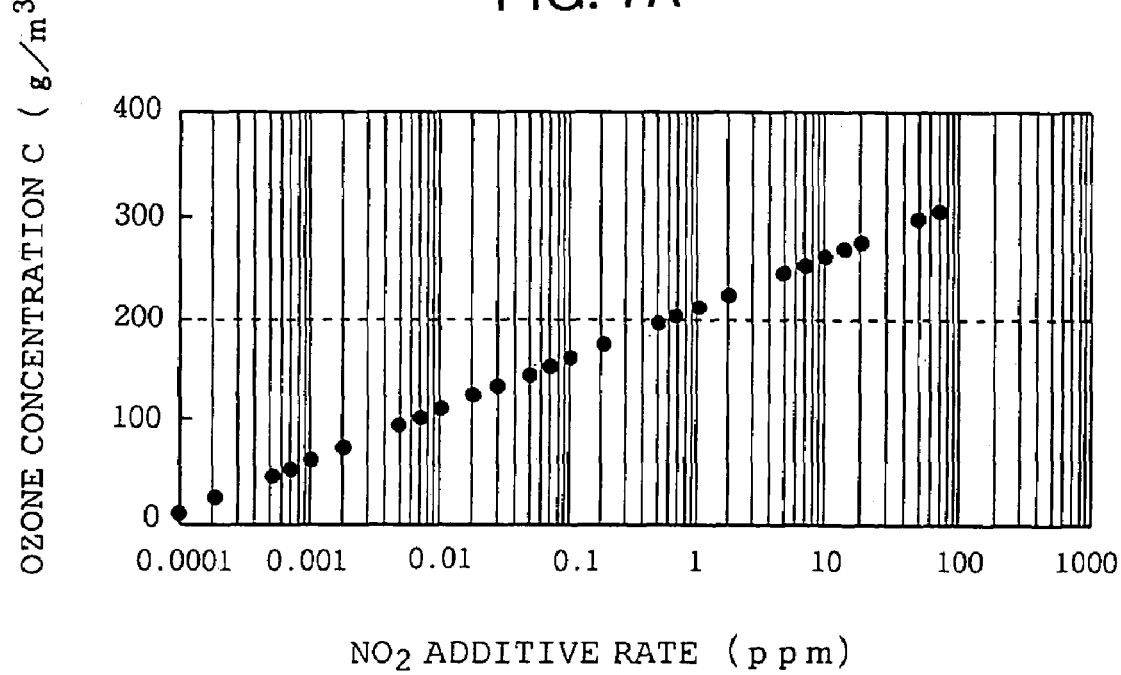

FIGS. 7A and 7B are views in which a measurement is made on the relation between the additive rate of nitrogen dioxide at the raw material gas flow rate of 5 L/min and the concentration of ozone which can be generated.

In the drawings, FIG. 7A is a characteristic diagram showing the quantity of addition of nitrogen dioxide in linear display, and FIG. 7B is a characteristic diagram showing the same in logarithmic display.

From the drawing, it has been understood that in order to obtain the ozone with an ozone concentration of 200 g/m$^3$ or more, it is sufficient if the nitrogen dioxide of 0.7 ppm or more exists. The ozone concentration is saturated at several tens ppm.

Besides, it has been understood that in order to obtain the ozone with an ozone concentration of 10 g/m$^3$ (4667 ppm) or more, it is sufficient if the nitrogen dioxide of 0.2 ppb (0.0002 ppm) or more exists.

Here, although the characteristics in the case where the nitrogen dioxide instead of the nitrogen gas is added, are shown, even when a nitrogen monoxide gas is added, since the nitrogen monoxide has a high bonding force to oxygen as the raw material gas by discharge, and the nitrogen monoxide is transformed into nitrogen dioxide, ozone can be generated under the addition quantity almost equal to the addition quantity of the nitrogen dioxide.

As a result of the examination of these examples, a chemical reaction process by the discharge of a raw material gas, the wavelength of excited light by the discharge of a material, a photochemical reaction of the excited light, and the like, it has been understood that ozone can be generated by a novel ozone generation mechanism.

The oxide compound gas such as nitrogen dioxide has a thermal catalytic reaction function by a circulation reaction cycle in which the oxide compound gas is dissociated into an oxygen atom and a suboxide such as nitrogen monoxide by excited light, and the dissociated suboxide is regenerated to the oxide compound gas by a series of chemical reactions, and a photocatalytic reaction function in which the oxide compound gas absorbs excited light, so that the oxide compound gas itself accelerates the dissociation of the oxygen gas.

With respect to the ozone generation mechanism in the thermal catalytic reaction function and the photocatalytic reaction function of the oxide compound gas of this invention, nitrogen dioxide as an example of the oxide compound gas is used as an example, and an ozone generation operation and function will be described with reference to the schematic view of FIG. 2.

Figure 29:
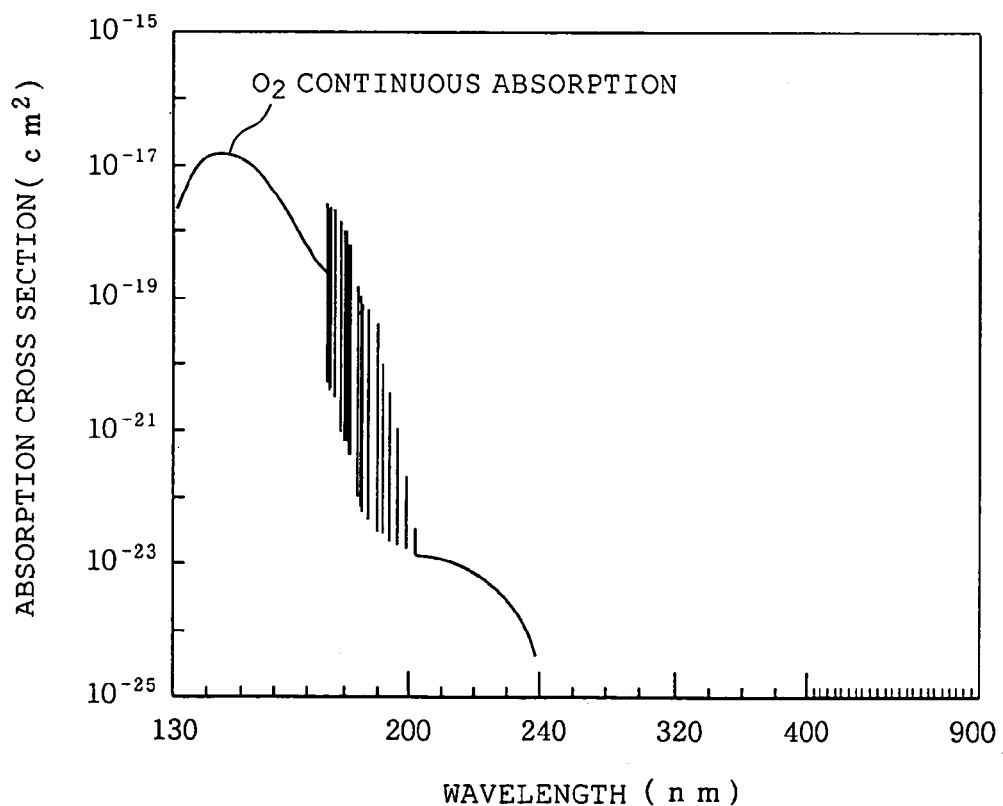
FIG. 29 is a characteristic diagram showing a light wavelength and an energy absorption coefficient of an oxygen molecule, at which an oxygen gas can be dissociated.

First, as shown in FIG. 29, an oxygen molecule has a light absorption spectrum (wavelength of ultraviolet rays of 130 to 200 nm) of a continuous spectrum at the wavelength of ultraviolet light of 245 nm or less, and it is known in an excimer lamp or the like emitting ultraviolet rays that the oxygen molecule absorbs excimer light of ultraviolet light of 245 nm or less, so that it is dissociated into oxygen atoms, and ozone is generated by triple collision (reaction equation R2) of the dissociated oxygen atom, the oxygen molecule and a third material. However, like the ozone generator, in the silent discharge in the oxygen gas as a main component and under a high pressure of 1 atom or more, excimer light of ultraviolet light of 245 nm or less is not emitted at all. Thus, dissociation of an oxygen atom by silent discharge light and a reaction process of ozone generation are not conceivable.

In FIG. 2, only reactions relating to the ozone generation in the silent discharge are enumerated. First, the operation and function of the thermal catalytic chemical reaction function of the oxide compound gas will be described. A reaction 303 indicates a reaction in which an oxygen molecule and a nitrogen molecule collide with each other in the discharge and nitrogen dioxide or the like is generated.

A reaction 304 indicates a reaction in which a gas atom or a gas molecule of the third raw material gas becomes an excited gas Ar* by the discharge. The excited third raw material gas emits excited light hv, and is returned to the ground atom.

A reaction 305 indicates a reaction in which an oxide compound molecule generated by the reaction 303 is dissociated by the excited light emitted from the reaction 304, and is decomposed into an oxygen atom and a suboxide compound.

Besides, the dissociated suboxide compound (nitrogen monoxide NO) reacts with an $HO_2$ radical or the like generated from moisture contained in the raw material gas, is immediately returned to nitrogen dioxide $NO_2$, and contributes to next oxygen atom dissociation. That is, a trace quantity of moisture performs a catalytic action of the nitrogen dioxide, and the nitrogen dioxide $NO_2$ functions as the thermal catalytic chemical reaction action for dissociating the oxygen atom.

Next, the operation and action of the photocatalytic reaction function of the oxide compound gas will be described.

In an energy level band of an oxide compound gas such as nitrogen dioxide, a band gap energy between a valence band and a conduction band (forbidden band) is several eV, and when light equivalent to the band gap energy is absorbed, the oxide compound gas itself is photoexcited, an electron escapes from the valence band and a positive hole (hole) state (excited state) occurs. When an oxygen molecule attaches to the oxide compound gas of the excited state, transfer of energy equivalent to light (ultraviolet rays of 130 nm to 200 nm) which can dissociate the oxygen gas is performed, and the excited state is returned to the ground state, and the oxygen gas is dissociated, so that the oxygen atom is generated. The oxide compound gas returned to the ground state is again excited by the light of the discharge, and serves to dissociate the oxygen gas. The photocatalytic action by the oxide compound gas and the excited light as stated above functions to increase the oxygen atoms.

An ozone generation reaction 306 by the oxygen atom indicates a reaction in which energy transfer is performed by triple collision of the oxygen atom generated at the reaction 305, the oxygen molecule, and a third material, and an ozone molecule is generated.

Next, a description will be given of an inhibition against an accelerating action of generation of an oxygen atom by the thermal catalytic chemical reaction function and the photocatalytic reaction function of the oxide compound gas, and the operation and action of decomposition of generated ozone. As another discharge reaction, nitrogen dioxide (oxide compound) and nitrogen gas generate $N_2O_5$ gas by a binding reaction of an oxygen gas and a generated ozone molecule, and there is also a reaction in which NOx gas such as $N_2O$ gas is generated by a nitrogen gas and an ozone atom. Further, a reaction 307 shows a reaction in which energy transfer is performed by triple collision of an OH radical molecule from a trace quantity of oxygen in a gas, nitrogen dioxide and third material, and a nitric acid cluster is generated. The ozonized oxygen 26 also includes the NOx gas and the nitric acid cluster (vapor) gas by the foregoing reaction. When the quantity of NOx and the quantity of the nitric acid cluster are increased, the quantities of the nitrogen dioxide (oxide compound) and the nitrogen gas dissociating the oxygen gas are decreased, and the action of lowering the efficiency of ozone generation is performed. The quantity of NOx other than the nitrogen dioxide is rapidly increased as the discharge power is increased and the ozone concentration becomes high, which causes the ozone concentration characteristic with respect to the discharge power W/Q injected per unit flow rate to exhibit the saturation characteristic. Accordingly, in the case where the nitrogen gas is added, when the discharge power is increased, the quantity of the NOx gas, such as the $N_2O_5$ gas or $N_2O$ gas, and the quantity of the nitric acid cluster, rather than the generation quantity of the nitrogen dioxide, are increased by discharge, and accordingly, there is a tendency that the ozone concentration characteristic is saturated at a low ozone concentration. Thus, when the nitrogen dioxide as the main factor of generating the ozone is added to the oxygen gas, high concentration ozone is obtained as compared with the case where the nitrogen gas is added to the raw material gas.

Besides, with respect to the generated ozone, as the discharge power becomes high, the discharge power density becomes high, and the gas temperature in the discharge becomes high, and further, as the concentration of the generated ozone becomes high, the thermal decomposition reaction of the ozone becomes large, which causes the ozone concentration characteristic with respect to the discharge power W/Q injected per unit flow rate to show the saturation characteristic.

The ozonized oxygen 26 is extracted by a series of reactions in the discharge, such as the dissociation reaction of the oxygen atom by the oxide compound gas and the excited light, the catalytic reaction of the oxide compound gas, ozone generation loss by transformation of the oxide compound gas into another oxide compound gas, the thermal decomposition reaction of ozone, and ozone generation by the triple collision reaction of the oxygen atom and the oxygen gas.

From the above ozone generation mechanism, in case only high purity oxygen is used, since ozone generation by silent discharge is hardly performed, for the purpose of accelerating the dissociation of the oxygen by the thermal catalytic chemical reaction or the photocatalytic reaction through the high purity oxygen (first raw material gas), the excited light and the oxide compound gas, a trace quantity of nitrogen gas or nitrogen dioxide $NO_2$ gas is added as the second raw material gas, and further, a trace quantity of third raw material gas such as a noble gas is added, so that the raw material gas is prepared. From the nitrogen gas as the second raw material gas, the nitrogen dioxide is generated by discharge at the reaction 303 with the oxygen gas.

As compared with the oxygen molecule, the generated nitrogen dioxide has a continuous absorption spectrum in which the oxygen atom can be dissociated by ultraviolet light of a long wavelength, and the wavelength of the ultraviolet light is about 300 nm to 400 nm. The nitrogen dioxide has an absorption spectrum band at wavelengths longer than the ultraviolet light capable of dissociating the oxygen molecule.

Thus when a trace quantity of noble gas Ar as the third raw material gas is added, argon emits excited light close to a wavelength of 300 nm from the noble gas Ar by silent discharge. By the reaction of the excited light and the nitrogen dioxide, the nitrogen dioxide is dissociated into an oxygen atom and a nitrogen monoxide NO, and ozone is generated by the triple collision (reaction equation R2) of the oxygen atom, the oxygen molecule and a third material.

Besides, this dissociated nitrogen monoxide NO reacts with an $HO_2$ radical generated from moisture contained in the raw material gas, is immediately returned to nitrogen dioxide $NO_2$, and contributes to next oxygen atom dissociation.

That is, a trace quantity of moisture performs a catalytic action of the nitrogen dioxide, and the nitrogen dioxide $NO_2$ functions as the thermal catalytic chemical reaction action for dissociating the oxygen atom, and contributes to the generation of ozone $O_3$. Besides, the nitrogen dioxide absorbs the excited light, so that the oxygen atoms are increased by the photocatalytic reaction of dissociating the oxygen gas coming in contact with the nitrogen dioxide, and the nitrogen dioxide contributes to the efficient generation of ozone.

In the apparatus of FIG. 1, the addition quantities of the second and the third raw material gases from the second raw material gas cylinder 12 and the third raw material gas cylinder 20 can also be controlled in accordance with an ozone concentration or a request from the user side. In a process not requesting clean ozone in the ozone gas much, the quantity of the second raw material gas is increased to generate higher concentration ozone, and in the case where clean ozone is requested in order to form an oxide film by CVD or the like, the second raw material gas is decreased, the quantity of the noble gas as the third raw material gas is increased, and a control is performed to achieve a mode in which ozone of the highest possible concentration can be extracted.

Besides, in the embodiment 1, the raw material gas, containing the oxygen gas, of 2 L/min or more is supplied, so that the high concentration ozone with a concentration of 200 $g/m^3$ or more can be extracted at an ozone generation quantity of 24 g/h or more, and therefore, the ozone generator can be obtained in which the ozone generation efficiency can be adequately raised, and the high concentration ozone can be certainly obtained.

Embodiment 2

Figure 9:
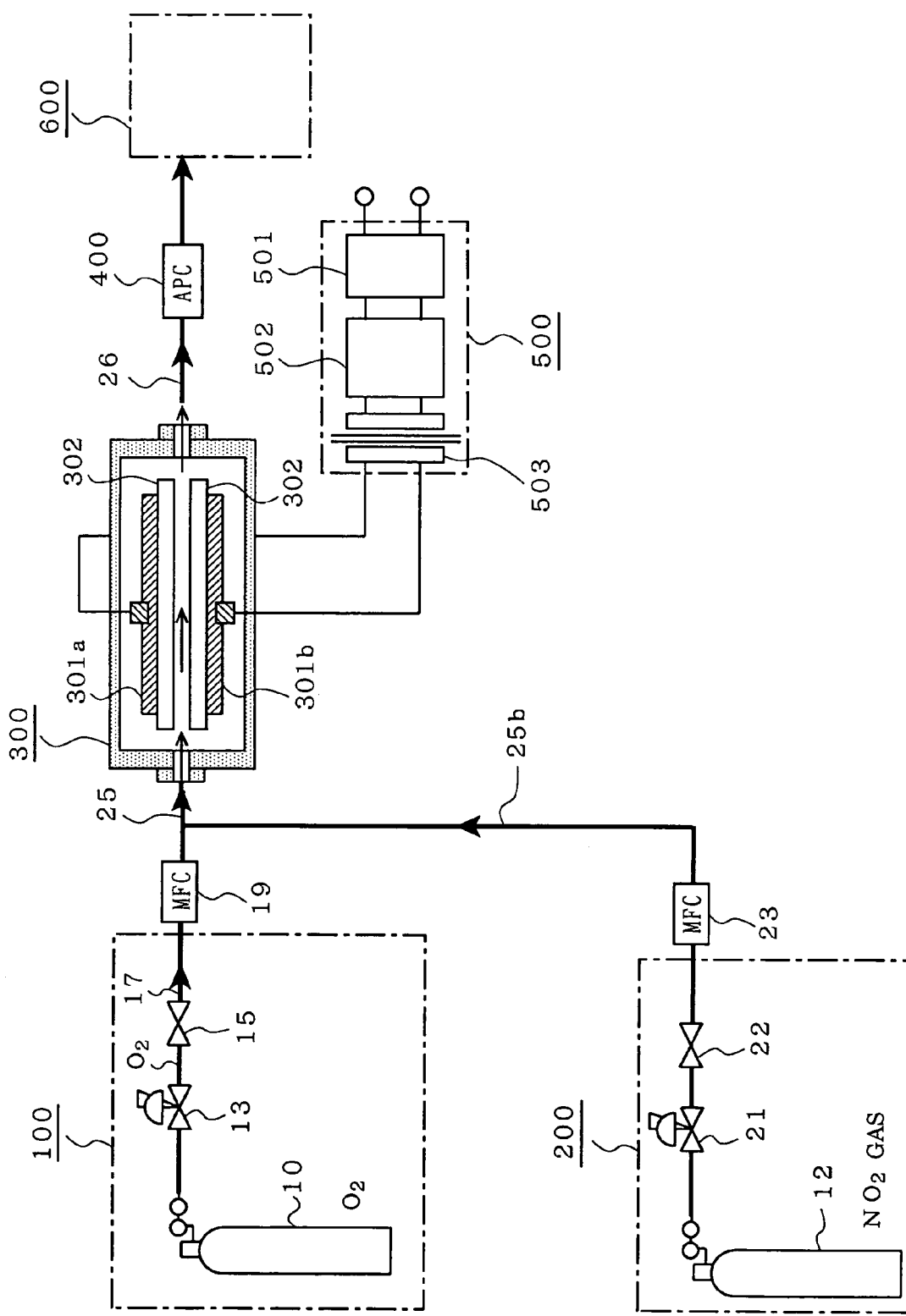
FIG. 9 is a gas system diagram showing an ozone generator of embodiment 2.

Embodiment 2 of this invention will be described with reference to FIG. 9. FIG. 9 is a block diagram showing a structure of a gas system in the embodiment 2.

In the embodiment 2, the details of a structure and the details of a method other than a specific structure and method described here are the same as the structure and method of the embodiment 1 described before, and the same operation is achieved. Incidentally, also in embodiments 3 to 11 described later, the details of a structure and the details of a method other than a specific structure and method are the same as the embodiment 1. In the respective drawings, the same symbols denote the identical or equivalent portions.

Although the three kinds of raw material gases are mixed in the embodiment 1, in the second embodiment, a raw material gas cylinder is constituted by two cylinders of an oxygen cylinder 10 and a nitrogen dioxide cylinder, and this embodiment is advantageous in the cost of an apparatus and its operation.

In FIG. 9, a trace quantity of nitrogen dioxide $N_2O_4$ ($NO_2$) (about 0.7 ppm to 10 ppm) is added from a cylinder 12 to oxygen (first raw material gas) having a purity of 99.99% or more supplied from the high purity oxygen gas cylinder 10, and these gases are supplied as a raw material gas 25 to an ozone generator 300. It is preferable that an additive rate of nitrogen dioxide $N_2O_4$ ($NO_2$) is from 0.0002 ppm to several tens ppm with respect to the oxygen gas as shown in FIG. 7. The other structure is the same as FIG. 1 of the embodiment 1.

In this embodiment 2, although the one kind of gas of the cylinder 12, that is, the trace quantity of nitrogen dioxide $N_2O_4$ ($NO_2$) is added to the oxygen gas of the oxygen gas cylinder 10, the nitrogen dioxide $N_2O$ gas itself becomes a nitrogen atom by silent discharge, and also becomes an oxide compound gas, and this gas can also emit ultraviolet rays of 300 nm as the discharge excited light.

Thus, there is an effect that the addition of only one kind of gas functions as both the second raw material gas and the third raw material gas, and an ozone gas can be effectively generated. When the nitrogen dioxide is directly added to the oxygen gas, the ozone generation efficiency becomes higher than that of the case where nitrogen is added, and as a result, there is an effect that the generation quantity of NOx by-product can be made extremely small. Besides, since only one kind of gas is added to the oxygen gas, there is a merit that the equipment can be easily formed. As the oxide compound gas to be added, nitrogen monoxide, carbon dioxide, or carbon monoxide is effective in addition to nitrogen dioxide.

The ozone generator of the second embodiment includes, in the ozone generator for generating ozone by applying a specified process to an oxygen gas by, discharge, the first raw material gas supply unit 10 for supplying the oxygen gas as the first raw material gas, and the second raw material gas supply unit 12 for supplying the oxide compound gas as the second raw material gas, in which by excited light excited and generated by the discharge under existence of the oxygen gas and the oxide compound gas, the oxide compound gas is dissociated, or the oxide compound gas is excited to have an accelerating action of dissociation of the oxygen gas, so that the ozone is generated, and therefore, the ozone generator can be obtained in which the kind of added gas is simplified, and the ozone generation efficiency can be adequately raised.

Besides, according to the embodiment 2, in the above structure, as a unit for changing the ozone concentration or ozone generation quantity, a variable unit including a flow controller (MFC) 23 capable of changing the additive rate of the nitride dioxide gas to the oxygen gas is provided, so that the ozone generator can be obtained in which the ozone generation efficiency can be more adequately raised.

Embodiment 3

Figure 10:
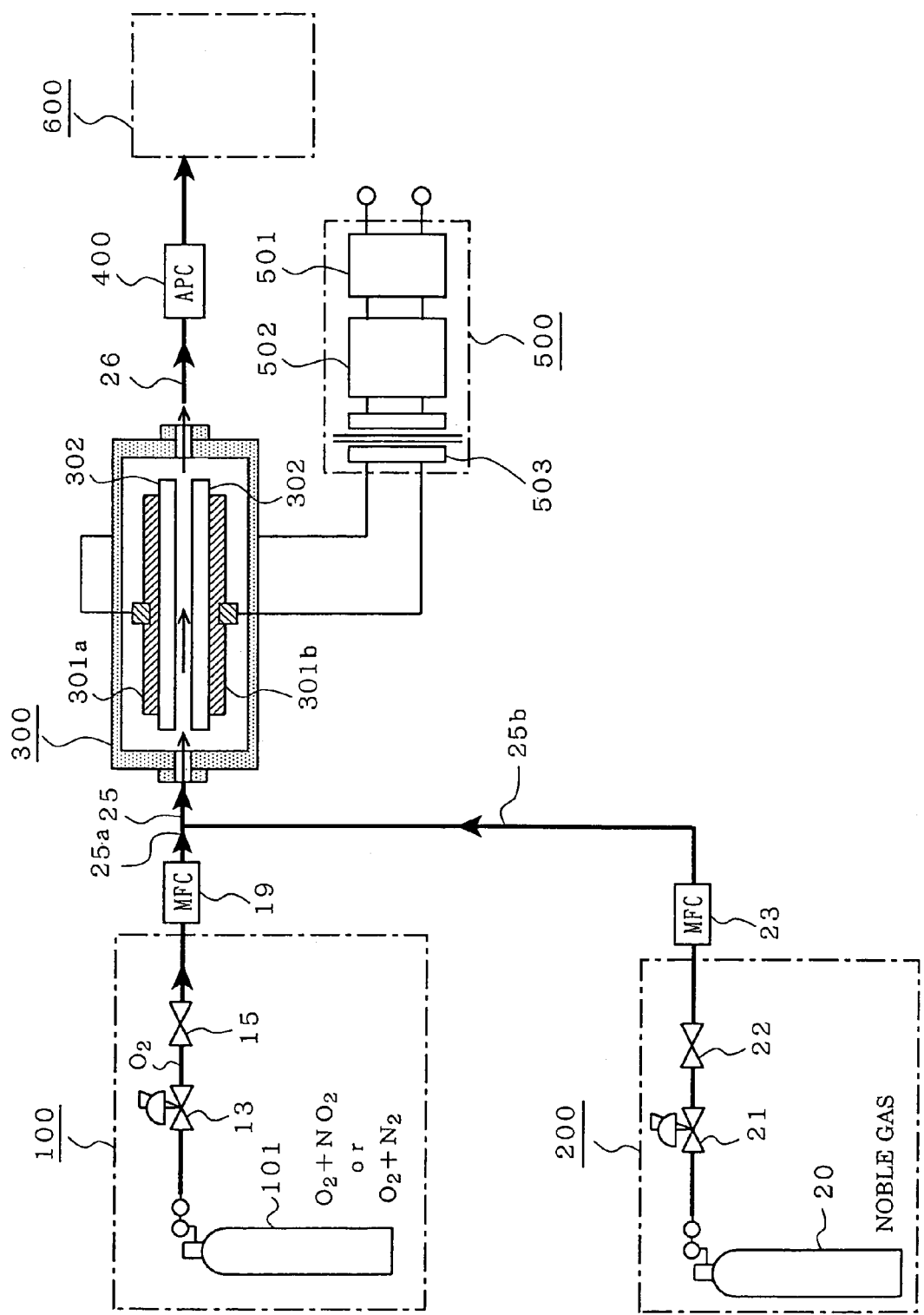
FIG. 10 is a gas system diagram showing an ozone generator of embodiment 3.

Embodiment 3 of this invention will be describe d with reference to FIG. 10. FIG. 10 is a block diagram showing a structure of a gas system of the embodiment 3.

In FIG. 10, a first and second raw material mixture gas in which a trace quantity of nitrogen or nitrogen dioxide $N_2O_4$ ($NO_2$) (second raw material gas) is mixed to oxygen (first raw material gas) having a purity of 99.99%, is supplied from a first and second raw material mixture gas dedicated gas cylinder 101, and a noble gas such as argon is supplied from a cylinder 20.

In the embodiment 3, it has been experimentally confirmed that even if nitrogen dioxide $NO_2$ or nitrogen monoxide NO instead of nitrogen is mixed, nitrogen dioxide is generated by the reaction of reaction equations R71 and R81 (described later) in a discharge space part, and the ozone generation efficiency η is increased.

According to the embodiment 3, in the structure of the embodiment 1 or the embodiment 2, as a dedicated raw material gas cylinder for generating the ozone, the dedicated raw material gas cylinder 101 is constructed which contains the oxygen gas as the first raw material gas and the oxide compound gas as the second raw material gas or a trace quantity of nitrogen capable of generating nitrogen dioxide $N_2O_4$ ($NO_2$) or the oxide compound gas, so that the ozone generator capable of adequately raising the ozone generation efficiency can be obtained by the simple raw material supply structure.

Embodiment 4

Figure 11:
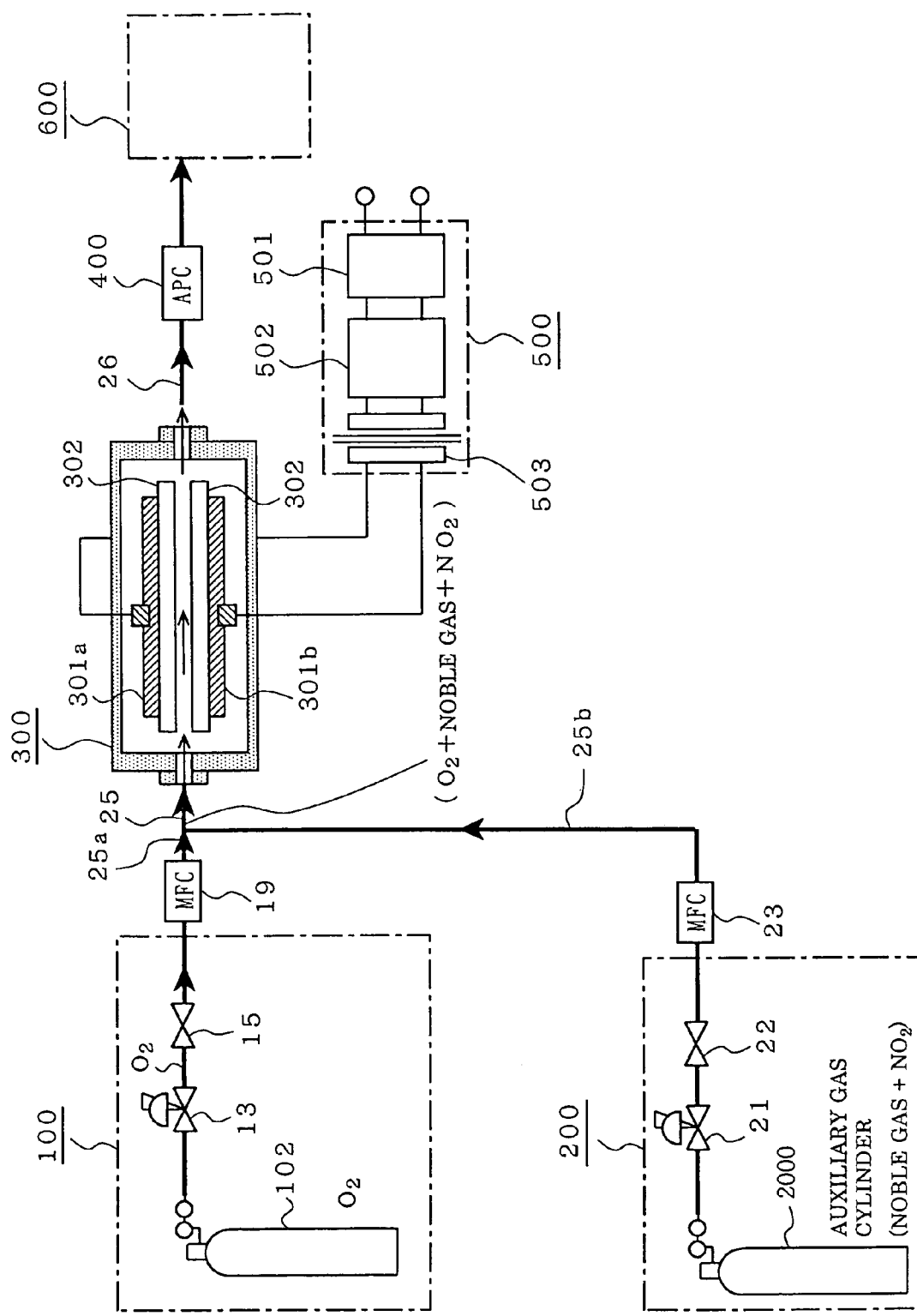
FIG. 11 is a gas system diagram showing an ozone generator of embodiment 4.

Embodiment 4 of this invention will be described with reference to FIG. 11. FIG. 11 is a block diagram showing a structure of a gas system of the embodiment 4.

In FIG. 11, a gas in which oxygen and an oxide compound gas such as a nitrogen dioxide gas are mixed, is supplied from an oxygen (first raw material gas) cylinder 102 containing oxygen with a purity of 99.99% and from an auxiliary gas cylinder 2000 in which a trace quantity of nitrogen monoxide or nitrogen dioxide $N_2O_4$ ($NO_2$) (second raw material gas) is mixed with a noble gas (helium, neon, argon, xenon, etc.). The other structure is the same as FIG. 1 in the embodiment 1.

In the embodiment 4, it has been experimentally confirmed that even if nitrogen monoxide NO instead of nitrogen dioxide is mixed, since the nitrogen dioxide is very quickly generated from the nitrogen monoxide NO by the chemical reaction of the reaction equations R71 and R81 in a discharge space part, the ozone generation efficiency η equal to the case where the nitrogen dioxide is added can be obtained.

According to the embodiment 4, in the structure of the embodiment 1 or the embodiment 2, with respect to the relevance between the nitrogen dioxide and the concentration performance of ozone which can be generated in the generator, as shown in FIG. 7, the sufficient performance can be obtained by merely adding a trace quantity of nitrogen dioxide $NO_2$, the addition quantity of which is from 0.7 ppm to 10 ppm.

However, as in the embodiments 1 and 2, it is very difficult to obtain a single nitrogen dioxide cylinder in view of the safety and refining of the cylinder.

Besides, as in the embodiment 3, when the dedicated cylinder in which the nitrogen dioxide is added to the oxygen is made, since the quantity of the nitrogen dioxide is very small, when the oxygen cylinder is made in which a predetermined quantity of nitrogen dioxide is added, the very expensive cylinder needs to be supplied. Besides, it has been understood that when the nitrogen dioxide is added to the main raw material gas (oxygen) for generating ozone, the oxygen gas in which the nitrogen dioxide is added, is consumed in proportion to the quantity of the supplied oxygen gas, and the cost of the raw material gas becomes very high.

The embodiment 4 has been made to solve the problems of the embodiments 1, 2 and 3.

That is, a unit for obtaining a raw material gas which is added with nitrogen dioxide of about 5 ppm and is supplied to an ozone generator, is constructed as follows.

The auxiliary cylinder 2000 is obtained by adding nitrogen dioxide of several tens (ppm) to thousands ppm, the addition of which is easy, to a noble gas as a third raw material gas, and a unit is formed which mixes and supplies the noble gas added with the oxide compound gas such as nitrogen dioxide from the auxiliary cylinder 2000 in a range of about 0.1% to several % to the oxygen gas as the first raw material gas from the oxygen cylinder 102. As a result, the oxide compound gas, such as the nitrogen dioxide, as the second raw material gas can be mixed to the oxygen gas at the order of ppm, and the oxygen gas 25 in which the third raw material gas of from several hundred ppm to several tens of thousands ppm is also added can be supplied to the ozone generator.

As described above, when the auxiliary raw material gas cylinder 2000 is formed in which the oxide compound gas is added to the noble gas, the ozone performance is sufficiently secured, and the relatively inexpensive auxiliary raw material gas cylinder 2000 can be provided.

Besides, the consumption of gas quantity of several % or less is sufficient for the consumption of the oxygen gas as the main gas, and there is an effect that running cost can be greatly reduced.

Further, since the addition quantity of the oxide compound gas to the oxygen raw material gas can be easily made variable by arbitrarily changing the gas quantity from the auxiliary gas cylinder, there is an effect that the ozone performance can be controlled in a specified range.

Incidentally, in the case where nitrogen is added to the oxygen gas, nitrogen dioxide must be generated once by discharge, and the quantity of the generated nitrogen dioxide is varied by the state of silent discharge and the discharge power. Thus, the generation quantity of high concentration ozone is not stably obtained, so that a large quantity of nitrogen gas must be added. On the other hand, when the nitrogen dioxide as the main factor to generate ozone is added to the raw material gas, ozone stabler than that in the case of the addition of the nitrogen gas is obtained.

Embodiment 5

Figure 12:
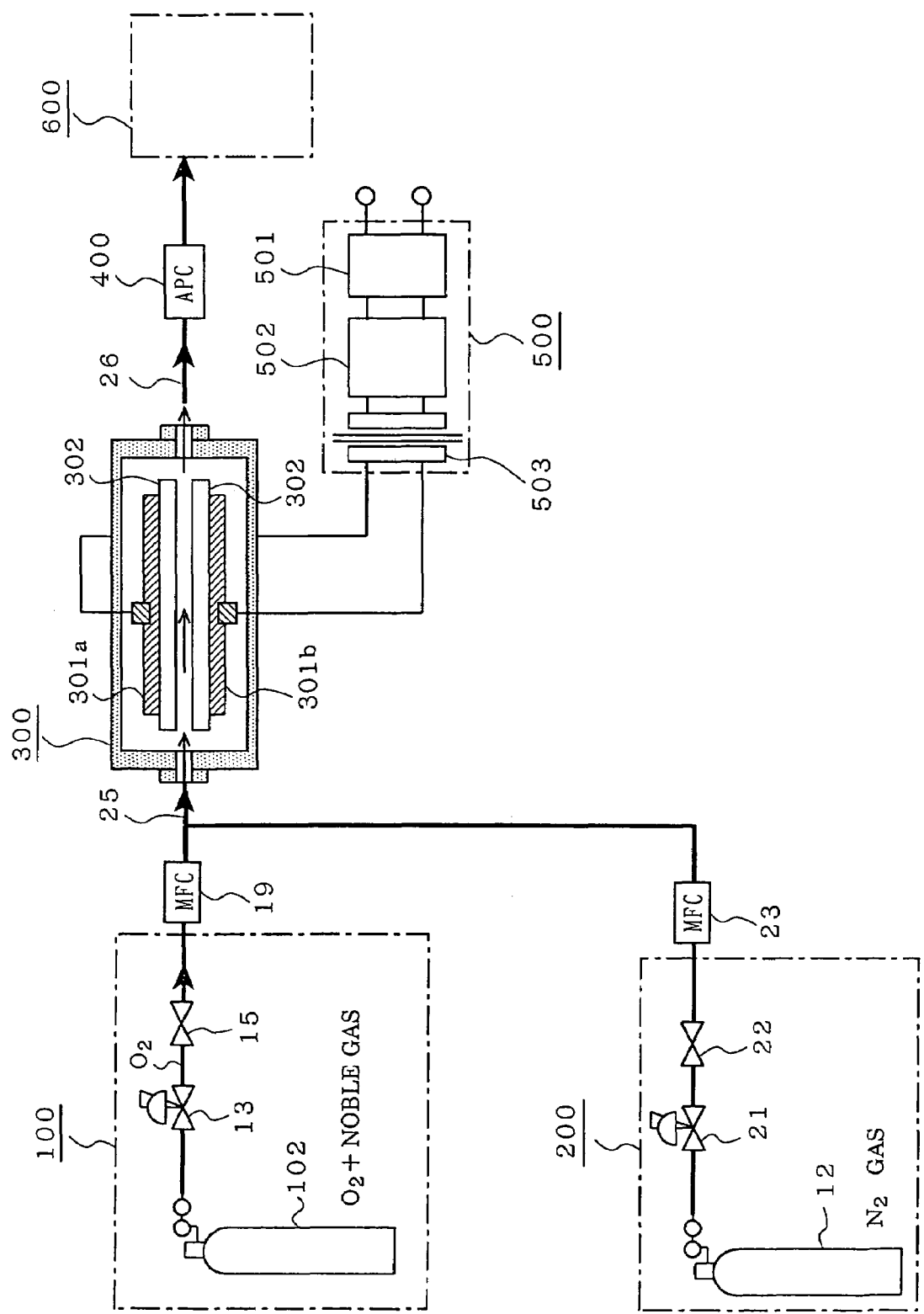
FIG. 12 is a gas system diagram showing an ozone generator of embodiment 5.

Embodiment 5 of this invention will be described with reference to FIG. 12. FIG. 12 is a block diagram showing a structure of a gas system in the embodiment 5.

In FIG. 12, a first and third raw material mixture gas in which a trace quantity of noble gas (third raw material gas) is mixed to oxygen (first raw material gas) having a purity of 99.99% or more is supplied from a first and third raw material mixture gas dedicated gas cylinder 102, and a nitrogen gas is supplied from a cylinder 12.

In the dedicated gas cylinder in which the noble gas is mixed to oxygen, even if the addition quantity of the noble gas is made 0.5% or more, a bad influence to increase a by-product gas such as NOx in an ozone generator does not occur, and therefore, the dedicated gas cylinder can be inexpensively formed.

The other structure is equivalent to the structure of FIG. 1 in the embodiment 1. Also in this structure, the ozone concentration equivalent to the embodiment 1 can be obtained.

According to the embodiment 5, in the structure of the embodiment 1 or the embodiment 2, as the dedicated raw material gas cylinder for generating the ozone, the first and third mixture gas dedicated raw material gas cylinder 102 is constructed which supplies the first and third mixture gas in which the gas made of the trace quantity of noble gas as the third raw material gas is made to be contained in the oxygen gas as the first raw material gas, and the nitrogen gas as the second raw material gas is supplied from the cylinder 12, so that the ozone generator can be obtained in which the ozone generation efficiency can be adequately raised by the simple raw material supply structure.

Embodiment 6

Figure 13:
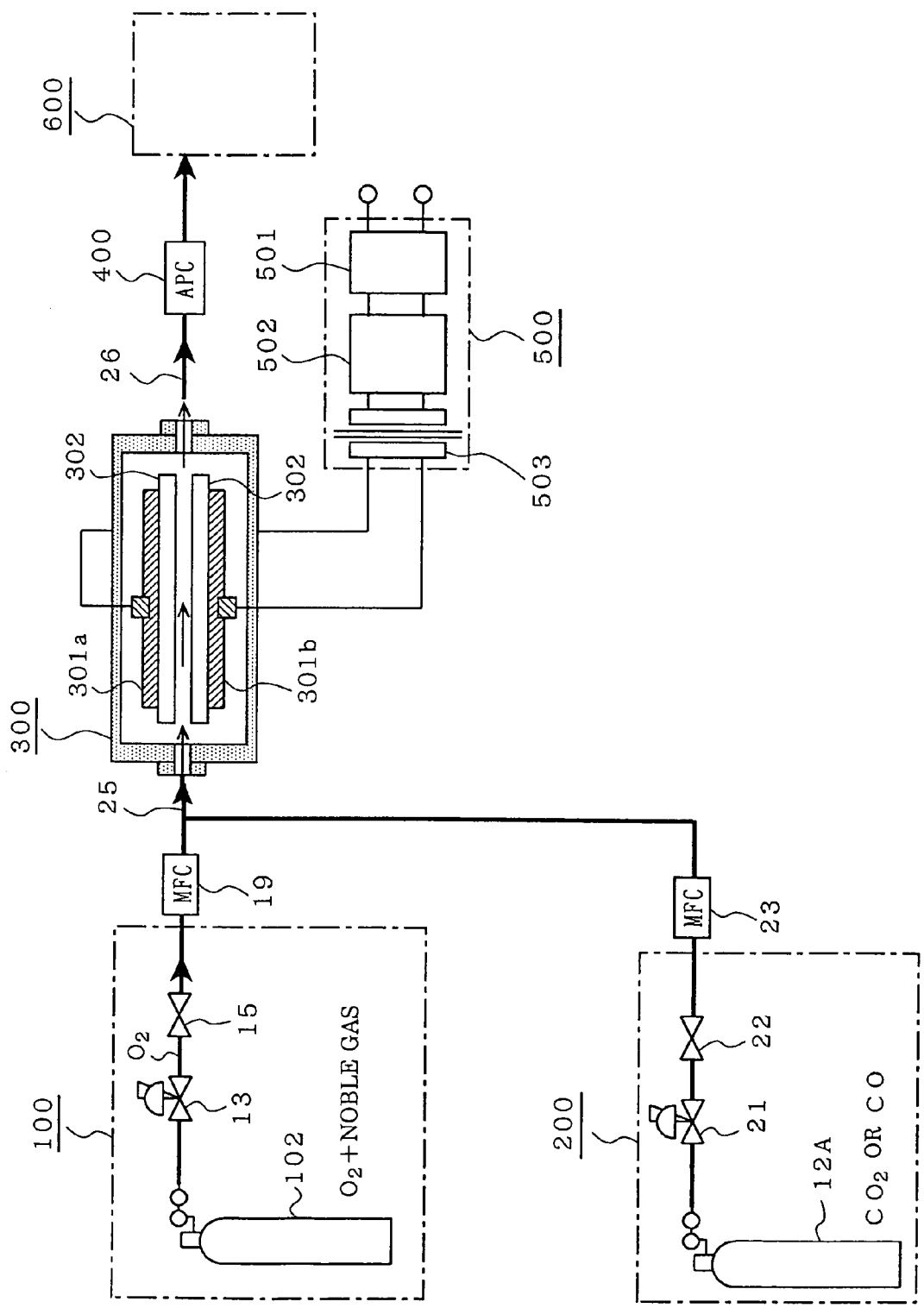
FIG. 13 is a gas system diagram showing an ozone generator of embodiment 6.

Embodiment 6 of this invention will be described with reference to FIG. 13. FIG. 13 is a block diagram showing a structure of a gas system in the embodiment 6.

In FIG. 13, a first and third raw material gas in which a trace quantity of noble gas (third raw material gas) is mixed to oxygen (first raw material gas) having a purity of 99.99% or more is supplied from a first and third raw material gas dedicated gas cylinder 102, and carbon dioxide $CO_2$ or carbon monoxide CO gas (second raw material gas) is supplied from a cylinder 12A.

Since the $N_2$ gas or nitrogen dioxide gas is not added, the ozone generator can be obtained in which a by-product such as NOx is not generated at all. The other structure is the same as FIG. 1 in the embodiment 1.

In the embodiment 4, even if carbon dioxide $CO_2$ or carbon monoxide CO instead of nitrogen dioxide is mixed as the second raw material gas, similarly to the oxygen atom by ultraviolet light of $NO_2$, in the following reaction equations, the $CO_2$ gas also causes the oxygen atom dissociation by light or accelerates the dissociation of the oxygen gas by the photocatalyst of the oxide compound gas, and it has been experimentally confirmed that also in the carbon dioxide, the ozone generation efficiency η is increased although the generation efficiency is worse than nitrogen dioxide.

R6: $CO_2 + h\nu \Rightarrow CO + O(^3P)$

R7: $H + O_2 + M \Rightarrow HO_2 + M$

R8: $HO_2 + CO \Rightarrow OH + CO_2$

R2: $O(^3P) + O_2 + \Rightarrow + M$

That is explained as follows. An oxygen atom $O(^3P)$ is formed (reaction of R6) by carbon dioxide $CO_2$ and ultraviolet light in the vicinity of 300 nm by excitation of the noble gas, and ozone is generated (reaction of R2) by triple collision of the generated oxygen atom $O(^3P)$ and an oxygen molecule $O_2$. Carbon monoxide CO generated by the reaction of R6 reacts with an $HO_2$ radical generated by the reaction of R7, and carbon dioxide $CO_2$ is regenerated (reaction of R8).

That is, during a time when the raw material gas passes through the silent discharge space, the carbon dioxide $CO_2$ repeats the reaction cycle of R6→R7→R8→R6 and is regenerated.

According to the embodiment 6, in the structure of the embodiment 1, 2, 3, 4 or 5, as the dedicated raw material gas cylinder for generating the ozone, the first and third mixture gas dedicated raw material gas cylinder 102 is constructed which supplies the first and third mixture gas in which the gas made of the trace quantity of noble gas as the third raw material gas is made to be contained in the oxygen gas as the first raw material gas, and the carbon dioxide $CO_2$ or carbon monoxide CO gas as the second raw material gas is supplied from the cylinder 12A, so that the ozone generator can be obtained in which the ozone generation efficiency can be adequately raised by the simple raw material supply structure, and the generation of a by-product such as NOx can be suppressed.

Embodiment 7

Figure 14:
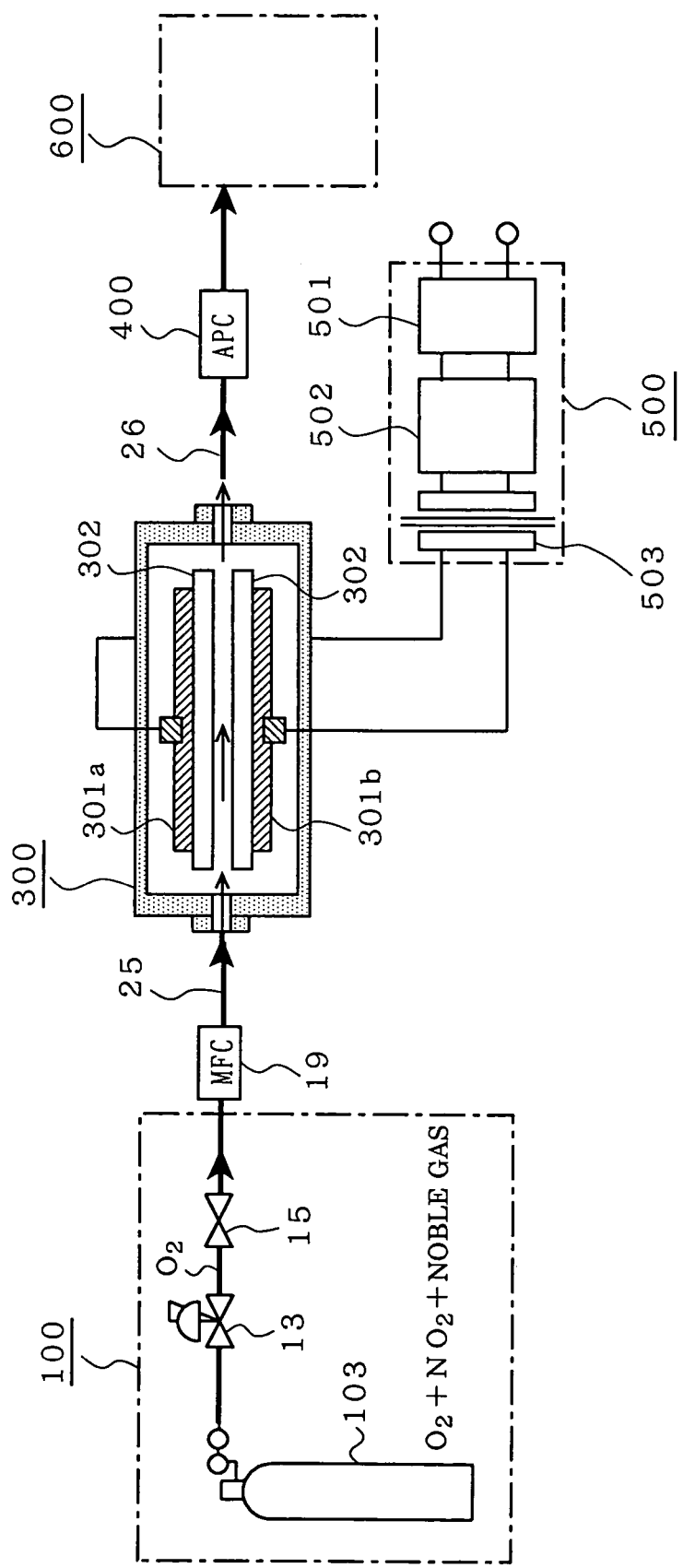
FIG. 14 is a gas system diagram showing an ozone generator of embodiment 7.

Embodiment 7 of this invention will be described with reference to FIG. 14. FIG. 14 is a block diagram showing a structure of a gas system in the embodiment 7.

In FIG. 14, a raw material gas 25 is supplied from a first, second and third raw material gas dedicated gas cylinder 103 for supplying a first, second and third raw material gas in which a trace quantity of nitrogen or nitrogen dioxide $N_2O_4$ ($NO_2$) (second raw material gas) and noble gas (third raw material gas) such as argon are mixed to oxygen (first raw material gas) having a purity of 99.99% or more. The other structure is the same as FIG. 1 in the embodiment 1.

It is known that also in the noble gas, such as helium, argon or xenon, or carbon dioxide, ultraviolet light of 300 to 400 nm is emitted by silent discharge. Thus, it has been experimentally confirmed that the ozone generation efficiency η is increased.

By ultraviolet light emitted by each of the nitrogen dioxide as the second raw material gas and the noble gas, the oxygen molecule can be dissociated and, or the oxygen molecule can be dissociated by the photocatalyst of the nitrogen dioxide, the nitrogen dioxide is regenerated by the reaction of the reaction equations R71 and R81 in the discharge space part, and the ozone is generated.

When the third raw material gas is made the noble gas or carbon dioxide, the addition quantity of the nitrogen compound to the ozone generator 300 can be made very small, and accordingly, the generation quantity of NOx as the nitrogen by-product other than ozone by silent discharge is also lowered, the nitric acid cluster of moisture and NOx can also be decreased, and the precipitation of metal impurity by nitric acid at the ozone outlet part is also decreased. Thus, a further clean ozone gas can be provided.

As stated above, by forming the dedicated cylinder for the ozone generator, there are obtained effects that the raw material gas supply system can be simplified, and the cost of the raw material gas can be reduced.

Besides, when the second raw material gas and the third raw material gas are added to the high purity oxygen, and further the nitrogen gas is added, the addition quantity of nitrogen can be variably controlled by the ozone generator and the ozone generation performance such as ozone concentration can be made stabler.

According to the embodiment 7, since the first, second and third mixture gas dedicated raw material gas cylinder 103 for supplying the first, second and third mixture gas is constructed, the ozone generator can be obtained in which the ozone generation efficiency can be adequately raised by the simple raw material supply structure.

The ozone generator of the embodiments 1 to 7 includes a first electrode 301a, a second electrode 301b facing a main face of the first electrode 301a to form a discharge area, a dielectric plate and a spacer for forming the discharge area between the first electrode 301a and the second electrode 301b, a first raw material gas supply unit for supplying a high purity oxygen gas as a first raw material gas, a second raw material gas supply unit for supplying a second raw material gas as an oxide compound gas or capable of generating an oxide compound gas, and a third raw material gas supply unit for supplying a third raw material gas which is excited by discharge and generates excited light to dissociate the oxide compound gas or to excite the oxide compound gas to accelerate dissociation of the oxygen gas, wherein an AC voltage is applied between the first electrode 301a and the second electrode 301b from a power supply to inject discharge power to the discharge area, specified quantities of the raw material gases by the first to the third raw material gas supply units are supplied to a space where the discharge is generated between gaps of the discharge area, and an ozone gas is generated.

Then, by the oxygen gas as the first raw material gas, the second raw material gas, the third raw material gas, and the discharge, i) the oxide compound gas exists, ii) excited light having a predetermined light wavelength is generated by excitation of the gas atom or molecule of the third raw material gas by the discharge, iii) the oxygen atom (O atom) is generated by the chemical reaction of the oxide compound gas and the excited light, or the photocatalytic action of the oxide compound gas, and iv) by the binding action with the raw material oxygen gas ($O_2$ molecule), and by the circulation cycle of the discharge and gas chemical reaction action of i), ii), iii) and iv), or by the photocataltic action of the oxide compound gas itself, ozone with a concentration of approximately 10 g/m³ (4667 ppm) or more can be generated, and this ozone can be extracted, and accordingly, the ozone generation efficiency can be adequately raised. Besides, there are effects that in order to obtain specified ozone, the discharge power can be made low, the ozone generator and the ozone power supply become compact, and the running cost becomes low. Besides, there are effects that the nitrogen additive rate of the raw material gas can also be lowered, the generation quantity of NOx gas other than the ozone gas generated in the ozone generator can also be lowered, the precipitation of metal impurity by the ozone gas extraction pipe and nitric acid can also be suppressed, and a clean ozone gas can be extracted.

Embodiment 8

Figure 15:
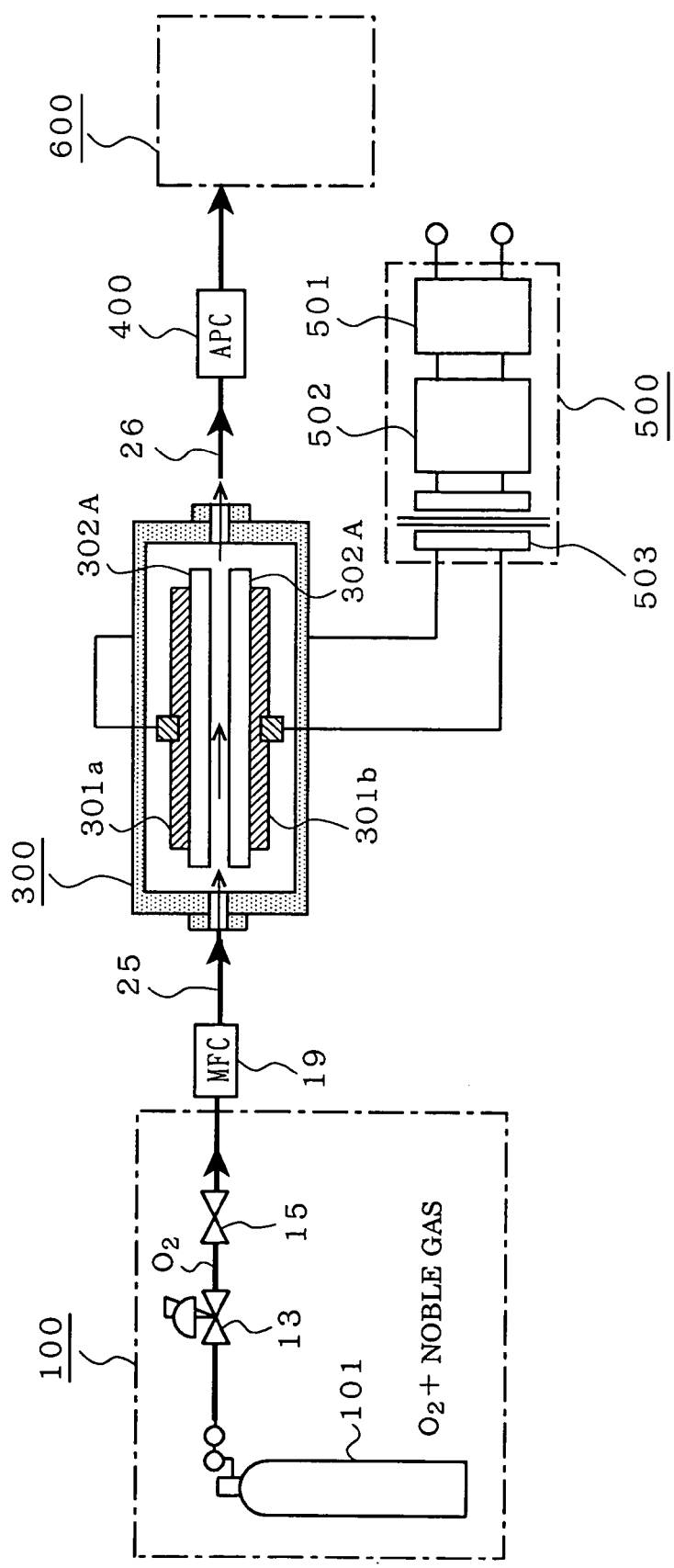
FIG. 15 is a gas system diagram showing an ozone generator of embodiment 8.

Embodiment 8 of this invention will be described with reference to FIG. 15. FIG. 15 is a block diagram showing a structure of a gas system in the embodiment 8.

In the embodiment 8, as shown in FIG. 15, a mixture gas in which a trace quantity of noble gas, such as argon Ar or helium, as a third raw material gas is added to high purity oxygen (first raw material gas) is supplied as a raw material gas 25 from a dedicated gas cylinder 101 to an ozone generator 300. Further, in a dielectric 302A, made of ceramic, glass or the like, of the ozone generator 300, a photocataltic component of tungsten oxide $WO_3$, chromium oxide $CrO_2$, iron oxide $Fe_2O_3$ or titanium oxide $TiO_2$ is made to be contained in the ceramic or glass constituting the dielectric 302A.

When the photocataltic material component such as tungsten oxide $WO_3$ or chromium oxide $CrO_2$ is contained in the dielectric 302A, made of ceramic, glass or the like, of the ozone generator 300, ultraviolet light of from 300 to 400 nm of discharge light by the noble gas such as Ar is irradiated onto the photocataltic surface of tungsten oxide $WO_3$ or the like, this ultraviolet light is absorbed by the tungsten oxide or the like, and the photocataltic material such as the tungsten oxide is brought into an excited state. When the oxygen gas is adsorbed to the photocataltic surface in the excited state, transfer of energy equivalent to light (ultraviolet rays of 130 nm to 200 nm) capable of dissociating the oxygen gas is performed when the photocataltic material is returned from the excited state to the ground state, and the oxygen gas is dissociated into the oxygen atoms. Thus, the photocataltic material such as the tungsten oxide $WO_3$ functions as the second raw material gas. Ozone is generated by triple collision (reaction equation R2) of the oxygen atom, the oxygen molecule and a third material.

As the photocataltic material, it is effective to cause different kinds of materials to be contained in the dielectric 302A or the electrode 301 at the same time. This is because the absorption light of the discharge light (ultraviolet light of 300 to 400 nm) from the noble gas, which is absorbed by the photocatalytic material to cause the excited state, varies according to the photocataltic material, and it appears that the different kinds of photocataltic materials can be effectively transferred into to the excited state by the same quantity of discharge light.

Besides, the photocataltic material may be a material, such as tungsten material W, which easily becomes tungsten oxide $WO_3$ by the oxygen gas.

In this embodiment 8, the photocataltic component, such as tungsten oxide, chromium oxide, titanium oxide or iron oxide, is made to be contained in the dielectric 302A. Although a film of the photocatalyst, such as tungsten oxide, chromium oxide, titanium oxide or iron oxide, may be formed on the discharge surface of the dielectric, the photocataltic film is degraded by sputtering from the silent discharge, the ozone performance is degraded with the lapse of operation time, and the lifetime of the ozone generator is shortened.

Thus, like this embodiment, it is preferable to adopt the structure that the photocataltic component, is contained in the dielectric 302A.

The ozone generator of the embodiment 8 includes a first electrode 301a, a second electrode 301b facing the first electrode 301a to form a discharge area, the dielectric 302A in the discharge area between the first electrode 301a and the second electrode 301b, a first raw material gas supply unit for supplying a high purity oxygen gas as a first raw material gas, a photocatalytic material or a material capable of being transformed into a photocatalyst, provided in the dielectric or the electrode in the discharge area, and a third raw material gas supply unit for supplying a third raw material gas which is excited by discharge and generates excited light to excite the photocatalytic material to accelerate dissociation of the oxygen gas, wherein an AC voltage is applied between the first electrode 301a and the second electrode 301b from a power supply to inject discharge power to the discharge area, a specified quantity of the raw material gas 25 by the first and third raw material gas supply unit is supplied to a space where the discharge is generated between gaps of the discharge area, and an ozone gas is generated.

When the dielectric 302A or the electrode 301 provided in the discharge area is made to contain the photocataltic material, by the oxygen gas as the first raw material gas, the third raw material gas, the photocataltic material, and the discharge, i) excited light with a predetermined light wavelength is generated from the noble gas by the discharge light, ii) an oxygen atom (O atom) is generated from the oxygen gas by the photocataltic reaction of the photocataltic material of the dielectric 302A or the electrode 301 and the excited light, ozone with a concentration of approximately 10 g/m³ (4667 ppm) or more is generated, and this ozone can be extracted. Thus, the ozone generator can be obtained in which the ozone generation efficiency can be adequately raised by the simple gas supply structure. In this embodiment 8, since nitrogen or nitrogen dioxide gas is not used, the clean ozone generator can be obtained in which NOx of a by-product gas is not generated.

Embodiment 9

Figure 16:
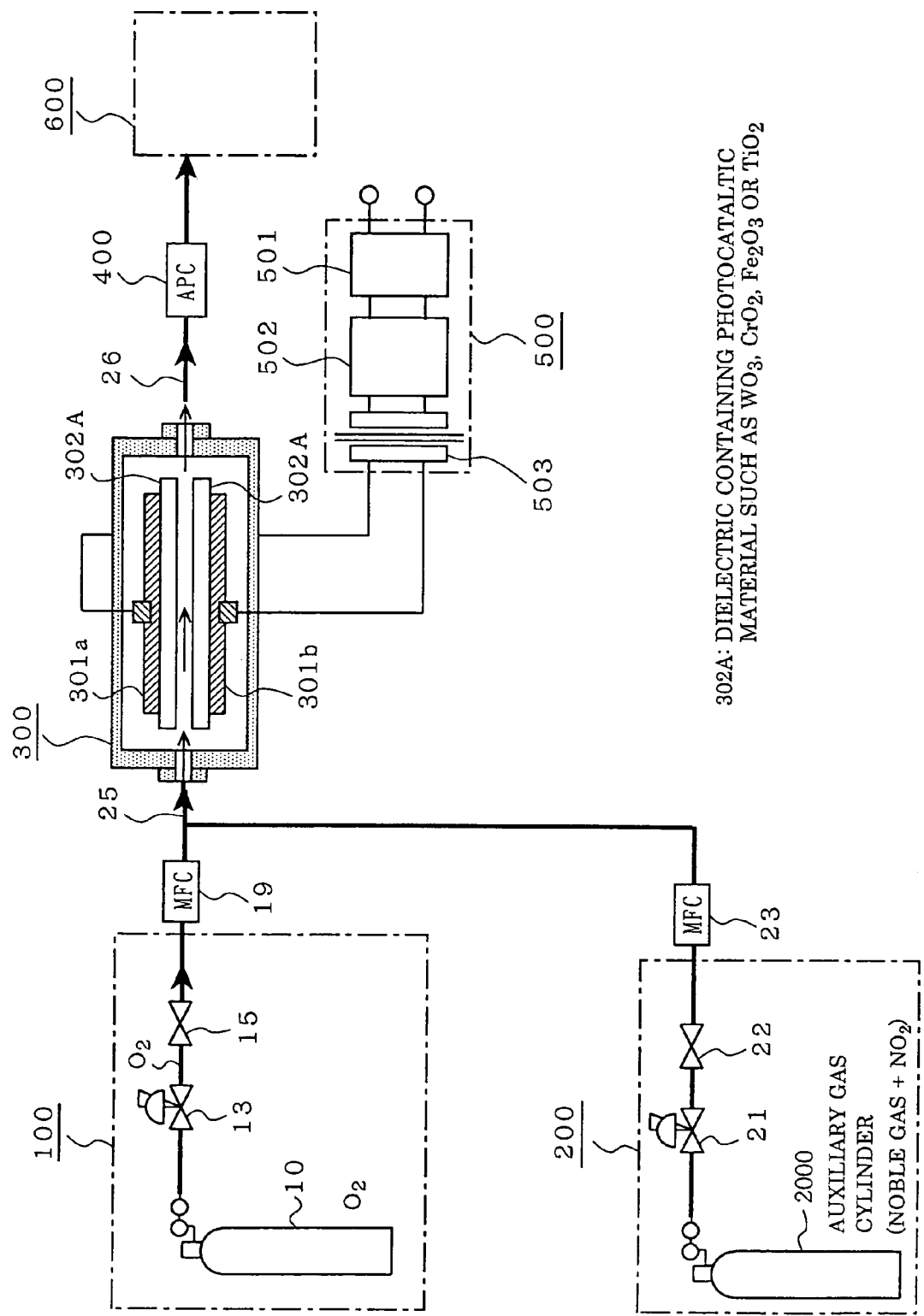
FIG. 16 is a gas system diagram showing an ozone generator of embodiment 9.

Embodiment 9 of this invention will be described with reference to FIG. 16. FIG. 16 is a block diagram showing a structure of a gas system in the embodiment 9.

In the embodiment 9, as shown in FIG. 16, by combination of a high purity oxygen (first raw material gas) cylinder 10 and an auxiliary cylinder 2000 in which nitrogen dioxide or the like is added to a noble gas, a high purity oxygen gas as the first raw material gas and an auxiliary raw material gas made of nitrogen dioxide $NO_2$ (second raw material gas) and a base noble gas (third raw material gas) such as argon are made a raw material gas 25 and are supplied to an ozone generator 300. A dielectric 302A, made of ceramic or glass, of the ozone generator 300 is made to contain a photocataltic component (functioning as a second raw material gas) such as tungsten oxide $WO_3$ or chromium oxide $CrO_2$. As the raw material gas, the auxiliary raw material gas has only to be added to the oxygen, and there is an effect that the cost of the dedicated cylinder of the raw material gas or pipe system equipment can be reduced.

The ozone generator of the embodiment 9 includes a first electrode 301a, a second electrode 301b facing the first electrode 301a to form a discharge area, the dielectric 302A in the discharge area between the first electrode 301a and the second electrode 301b, the first raw material gas supply unit 10 for supplying the oxygen gas as the first raw material gas, a photocatalytic material or a material capable of being transformed into a photocatalyst, provided in the dielectric 302 or the electrode in the discharge area, a second gas supply unit for supplying a second raw material gas as an oxide compound gas or capable of generating an oxide compound gas, and a third raw material gas supply unit for supplying a third raw material gas which is excited by discharge and generates excited light to excite the photocatalytic material and the oxide compound gas to generate an oxygen atom, wherein an AC voltage is applied between the first electrode 301a and the second electrode 301b from a power supply to inject discharge power to the discharge area, specified quantities of the raw material gases by the first to the third raw material gas supply units are supplied to a space where the discharge is generated between gaps of the discharge area, and an ozone gas is generated.

When the dielectric 302A or the electrode 301 provided in the discharge area is made to contain the photocataltic material, by the oxygen gas as the first raw material gas, the second and the third raw material gases in the auxiliary gas, the photocatalytic material, and the discharge, i) the oxide compound gas exists, ii) excited light having a predetermined light wavelength is generated from the noble gas in the auxiliary raw material gas by discharge light, and iii) by chemical reaction or photocatalytic reaction of the oxide compound gas, the photocatalytic material and the excited light, the oxygen atom (O atom) is generated from the nitrogen dioxide or oxygen gas, ozone with a concentration of approximately 10 g/m$^3$ (4667 ppm) or more can be generated, and this ozone can be extracted. Accordingly, the ozone generator can be obtained in which the ozone generation efficiency can be adequately raised by the simple gas supply structure.

In the embodiment 9, the dielectric in the ozone generator or the discharge surface of the electrode is formed of the photocataltic material, and when ozone is generated for a long time by the photocataltic material of the discharge surface, the discharge surface of the photocatalytic material is degraded or becomes dirty, and the generation capacity of ozone is lowered by the time-varying degradation, and the lifetime is shortened. However, when the dielectric in the ozone generator or the discharge surface of the electrode is made of the photocataltic material, and the oxide compound gas (second raw material gas) is added to the raw material gas, the oxide compound gas itself has the capacity to generate ozone, and the apparatus can be obtained in which ozone can be more stably generated, and the lifetime is long.

Embodiment 10

Figure 17:
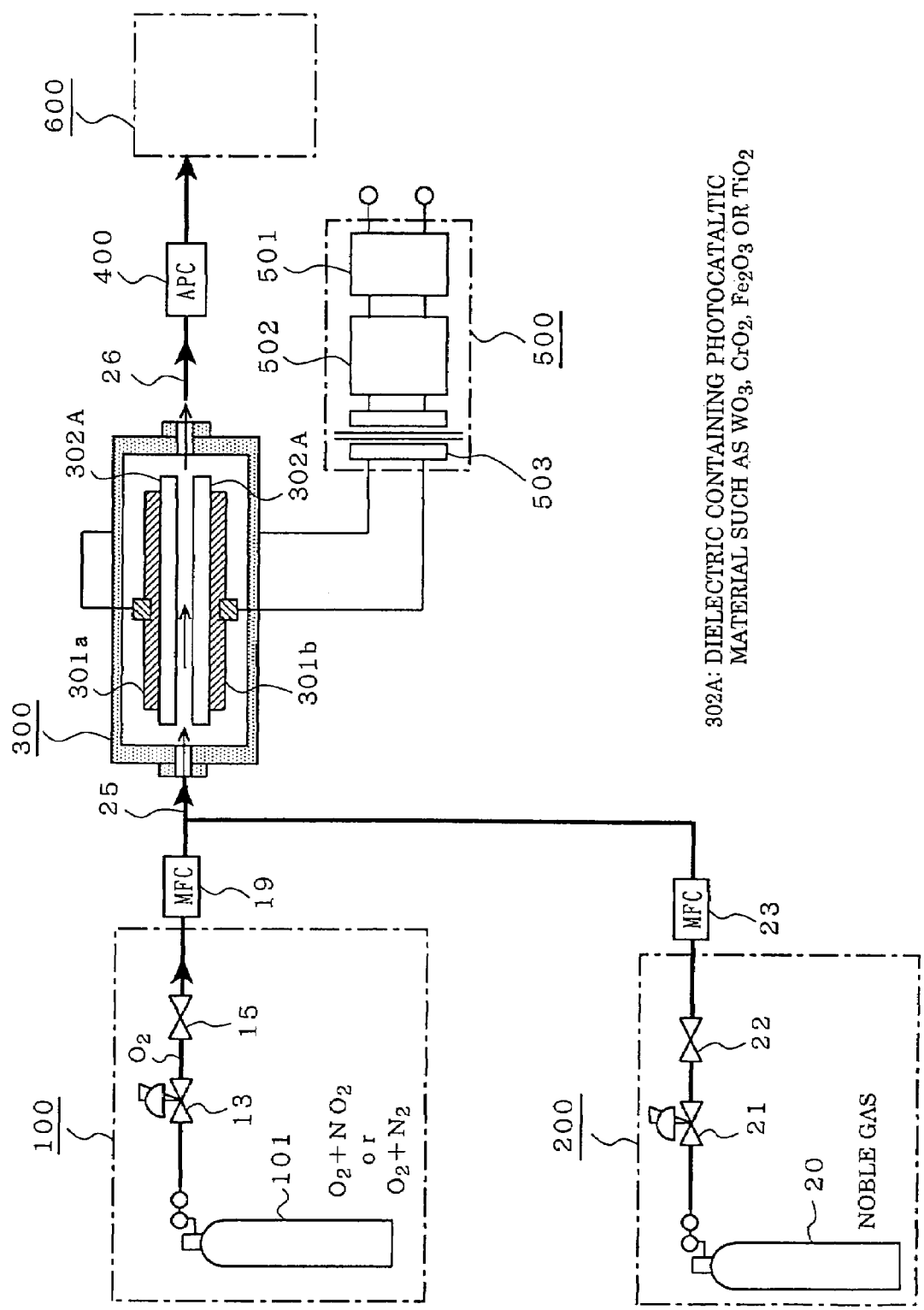
FIG. 17 is a gas system diagram showing an ozone generator of embodiment 10.

Embodiment 10 of this invention will be described with reference to FIG. 17. FIG. 17 is a block diagram showing a structure of a gas system in the embodiment 10.

In the embodiment 10, as shown in FIG. 17, a mixture gas in which a trace quantity of nitrogen $N_2$ or nitrogen dioxide $NO_2$ gas as a second raw material gas is added to high purity oxygen (first raw material gas) is supplied from a dedicated gas cylinder 101, a noble gas such as argon is supplied from a gas cylinder 20, and these gases are supplied as a raw material gas 25 to an ozone generator 300. In a dielectric 302, made of ceramic, glass or the like, of the ozone generator 300, a photocataltic material component of tungsten oxide $WO_3$, chromium oxide $CrO_2$, titanium oxide $TiO_2$ or iron oxide $Fe_2O_3$ is made to be contained in the ceramic, glass or the like. This also has the same effect as the embodiment 9.

Embodiment 11

Figure 18:
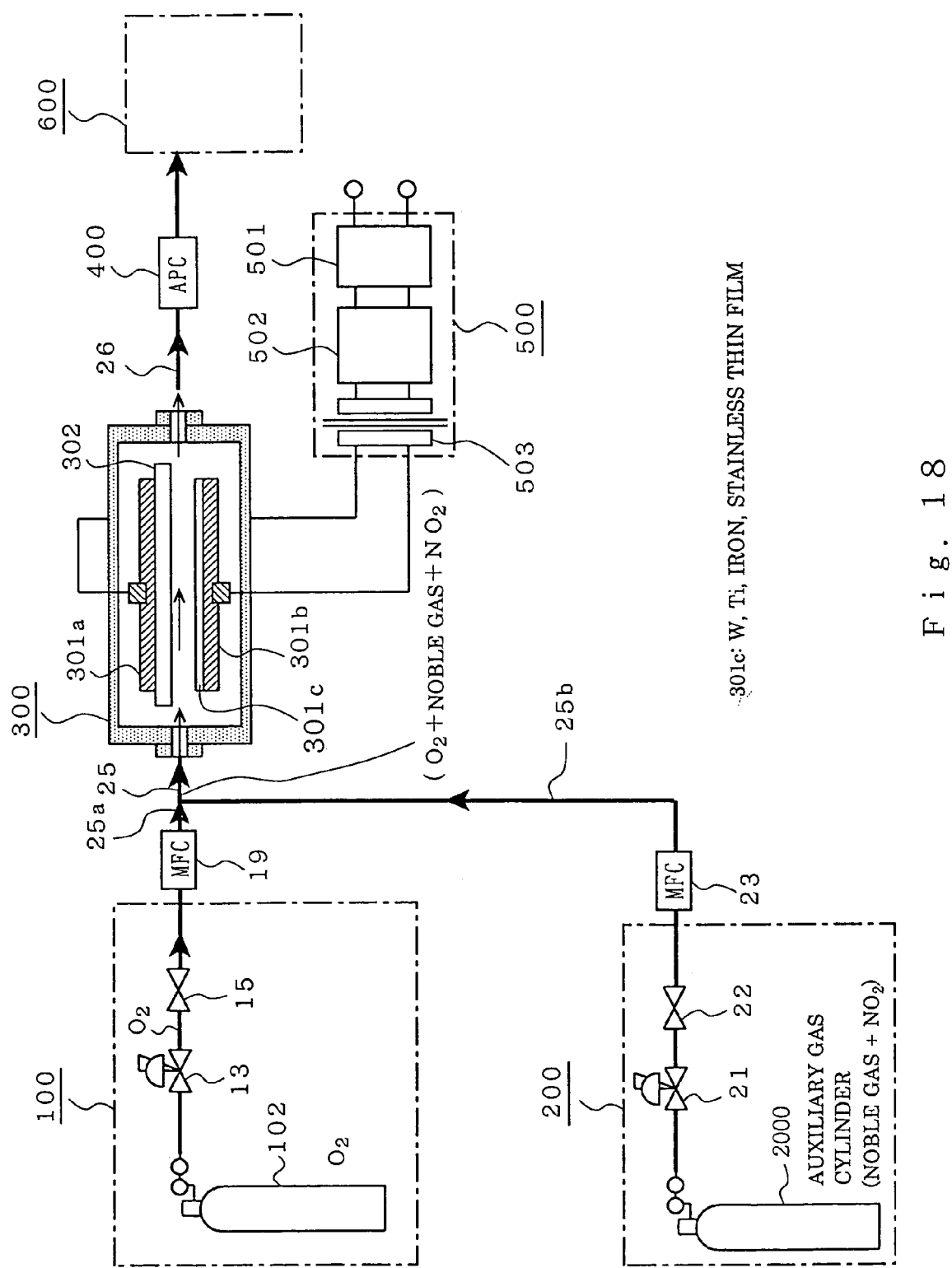
FIG. 18 is a gas system diagram showing an ozone generator of embodiment 11.

Embodiment 11 of this invention will be described with reference to FIG. 18. FIG. 18 is a block diagram showing a structure of a gas system in the embodiment 11.

In the embodiment 11, as shown in FIG. 18, by combination of a high purity oxygen (first raw material gas) cylinder 102 and an auxiliary cylinder 2000 in which nitrogen dioxide or the like is added to a noble gas, a high purity oxygen gas as a first raw material gas and an auxiliary raw material gas made of nitrogen dioxide $NO_2$ and a base noble gas such as argon are supplied as a raw material gas 25 to an ozone generator 300, and a tungsten material 301C is bonded to a dielectric 302, made of ceramic, glass or the like, of the ozone generator 300 and to a discharge surface of an electrode member 301b made of SUS as the other electrode. When the tungsten member 301 is bonded so as to constitute the electrode, the oxygen gas is made to flow, and ozone is generated, a tungsten oxide film $WO_3$ is formed on the discharge surface of the tungsten member 301C, and the tungsten oxide film $WO_3$ becomes a photocatalyst. The photocatalyst has the same function as the photocataltic material of the embodiment 9. Besides, also when a titanium member 301C is bonded to the discharge surface of the electrode member 301b, a titanium oxide film $TiO_2$ as a photocatalyst is similarly formed and is effective. As the raw material gas, the auxiliary raw material gas has only to be added to oxygen, and there is an effect that the cost of the dedicated cylinder of the raw material gas or pipe system equipment can be reduced.

Besides, as the photocataltic material, although $WO_3$ material, $CrO_2$ material, $TiO_2$ material or $Fe_2O_3$ material has been indicated, as the photocataltic material, another metal semiconductor material or ferroelectric material also has a photocataltic effect, and also when the metal semiconductor material or the ferroelectric material is adopted, high concentration ozone can be efficiently generated.

When the photocataltic film formed on the surface of the dielectric 302, made of ceramic, glass or the like, of the ozone generator 300 or the electrode surface, is formed of two or more different photocataltic materials, not the single photocataltic material, the photocataltic film can absorb discharge light of plural wavelengths. As a result, the photocataltic film is brought into the excited state more efficiently, dissociation of oxygen can be efficiently performed, the ozone generation quantity is increased, and high concentration ozone can be obtained.

Besides, according to the embodiment, in the structure of the foregoing description, the second raw material gas is one of nitrogen dioxide, nitrogen monoxide, nitrogen, carbon dioxide, and carbon monoxide, and the second raw material gas of from 0.2 ppb to several hundred ppm is added to the oxygen gas, so that ozone with a concentration of approximately 10 g/m$_3$ (4667 ppm) or more can be generated.

Besides, according to the embodiment, in the structure of the foregoing description, the third raw material gas is one of noble gas, such as helium, neon, argon or xenon, nitrogen monoxide, nitrogen dioxide, and carbon dioxide, and the third raw material gas of from several hundred ppm to 50000 ppm is added to the oxygen gas, so that ozone with a concentration of approximately 10 g/m$^3$ (4667 ppm) or more can be generated.

Here, with respect to the foregoing embodiments 1 to 11, a supplemental description will be made with reference to FIGS. 19 to 28.

The embodiment of the invention does not aim at suppressing the time-varying concentration reduction of the generated ozone gas, but aims at finding a new system to obtain high concentration ozone by an ozone generator, realizing an apparatus based on that, and raising the efficiency of extractable ozone to realize a compact generator and ozone generating system.

Besides, as a supplemental result from the former object, another object is to provide an ozone generator in which a nitrogen additive rate is suppressed to several hundred ppm or less, the total quantity of NOx secondary gas, such as $N_2O_5$, other than ozone gas by discharge, and the by-product such as a nitric acid cluster is suppressed to a very small generation quantity as compared with the conventional nitrogen additive rate, the generator is compact (predetermined discharge area or less), and a high concentration ozone gas with a high flow rate and a concentration of 200 g/m$^3$ (93333 ppm) or more can be obtained at an ozone generation quantity of 24 g/h or more.

Besides, still another object is to provide a stabilized raw material gas by causing the raw material gas mainly containing the oxygen gas for the ozone generator, which can achieve the two former objects, to be contained in a dedicated cylinder.

Figure 19:
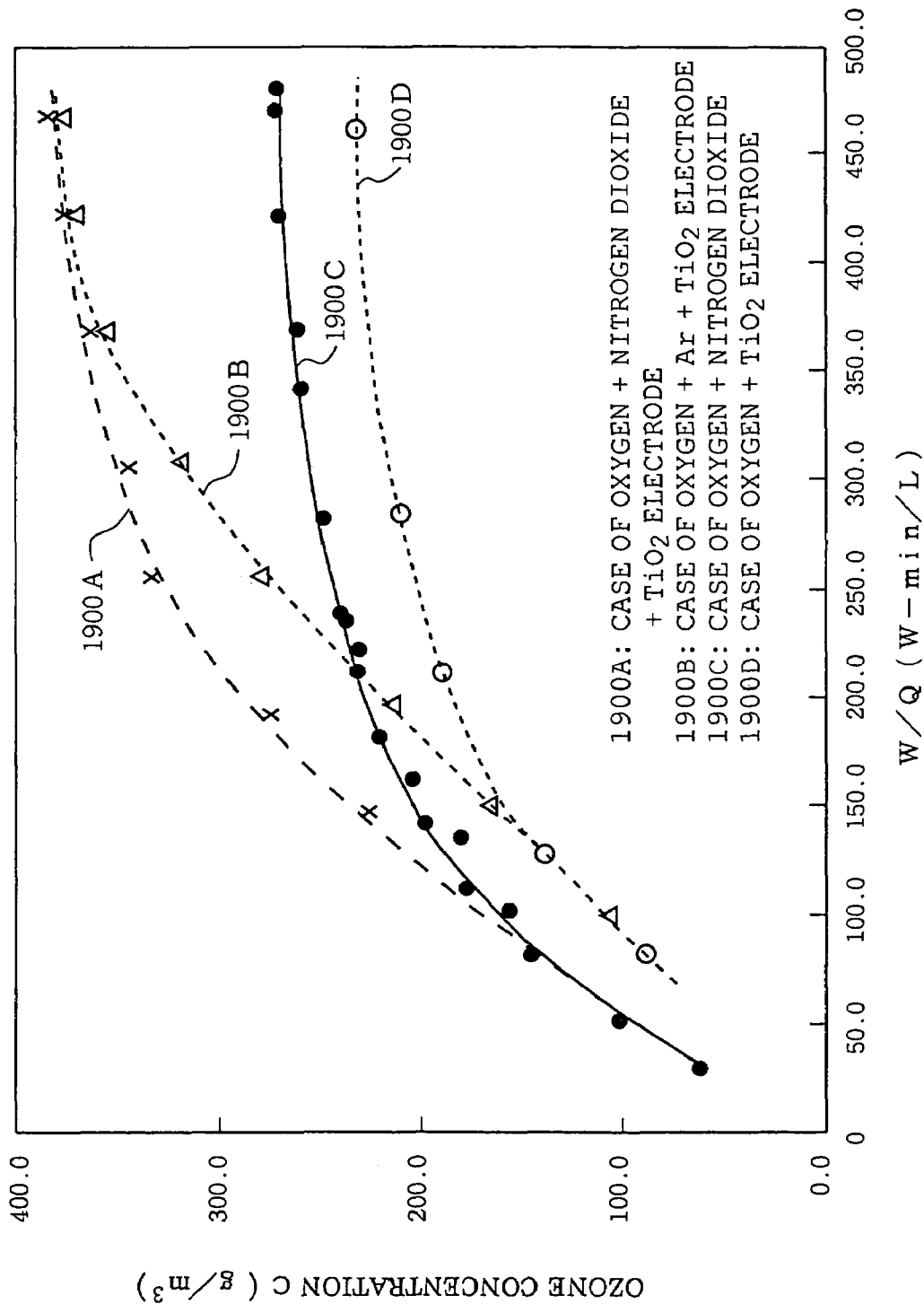
FIG. 19 is a characteristic diagram showing an ozone concentration characteristic according to existence of a photocataltic material of this invention.

FIG. 19 is a view in which an ozone concentration characteristic in a case where nitrogen dioxide is added to a raw material gas, and an ozone concentration characteristic in a case where a TiO$_2$ film of metal oxide as a photocatalyst is formed on an electrode surface in an ozone generator.

The drawing shows ozone concentration characteristics with respect to discharge power W/Q injected per unit flow rate, a characteristic 1900C indicates a characteristic in a case where nitrogen dioxide NO$_2$ of 10 ppm is added to oxygen of a raw material gas, a characteristic 1900D indicates a characteristic in a case where a raw material gas is made only an oxygen gas and a TiO$_2$ film is formed on the electrode surface of a discharge part of the ozone generator, a characteristic 1900B indicates a characteristic in a case where an electrode film of the ozone generator is made a TiO$_2$ film, and an argon gas is added to an oxygen gas to prepare a raw material gas, and a characteristic 1900A indicates a characteristic in a case where the electrode surface of the ozone generator is made a TiO$_2$ film, and nitrogen dioxide NO$_2$ is added to an oxygen gas to prepare a raw material gas. As is understood from the drawing, with respect to the ozone concentration characteristic, although sufficient ozone can be generated in any condition, the ozone concentration characteristic (1900D) in the case of the combination of the TiO$_2$ electrode and the oxygen gas is worst. This is because in silent discharge using only the oxygen, the light quantity of ultraviolet light of 300 to 400 nm to photoexcite the TiO$_2$ film as the photocataltic material, which is emitted by discharge, is low, so that the TiO$_2$ film can not be sufficiently photoexcited, and does not sufficiently function as the photocataltic material.

Next, when the argon gas or nitrogen dioxide is added to the TiO$_2$ electrode and the oxygen gas (1900B, 1900A), a high concentration not lower than an ozone concentration of 300 g/m$^3$ is obtained under the condition that the unit injection power W/Q is 300 or more, and the maximum becomes about 380 g/m$^3$. This is because the nitrogen dioxide or argon gas can sufficiently emit the ultraviolet light of 300 to 400 nm by silent discharge, so that TiO$_2$ of the photocataltic material or nitrogen dioxide NO$_2$ itself can be photoexcited, and the oxygen gas (oxygen molecule) can be sufficiently dissociated into the oxygen atoms by the photoexcited TiO$_2$ or nitrogen dioxide NO$_2$ and as a result, high concentration ozone can be obtained. Besides, when the unit injection power W/Q is 200 or less, unless the nitrogen dioxide is added to the raw material gas at the TiO$_2$ electrode, the ozone concentration characteristic eventually becomes low. That is, this means that when the nitrogen dioxide is added to the raw material gas, the ozone generation efficiency becomes higher than that of the case of the TiO$_2$ electrode. It can be construed that this cause is such that under the condition of low W/Q, the ultraviolet light of 300 to 400 nm emitted from the discharge does not effectively impinge on the electrode surface, and the dissociation efficiency of the oxygen gas is low. On the other hand, since the nitrogen dioxide as the photocataltic material is gas itself, the ultraviolet light of 300 to 400 nm emitted by the silent discharge effectively impinges, the dissociation efficiency of the oxygen gas becomes higher than that of the photocataltic material of the electrode surface, and the ozone generation efficiency also becomes high.

Incidentally, although not shown, it has been confirmed that even when a noble gas such as a He gas instead of an argon gas is added as the noble gas, the ultraviolet light of 300 to 400 nm can be emitted by silent discharge, and it contributes to the role to raise the generation of ozone. Besides, since the He gas has a molecular weight smaller than the argon gas, the diameter of one discharge column of the silent discharge becomes large, and it has an effect to stabilize the discharge.

Further, a though it has been shown that the TiO$_2$ film is formed on the electrode surface of the generator, when a tungsten electrode, or an iron or stainless electrode is used, a tungsten oxide film WO$_3$ or a ferric oxide film Fe$_2$O$_3$ is formed on the discharge surface, the tungsten oxide film WO$_3$ or the ferric oxide film Fe$_2$O$_3$ has the photocataltic action, and the ozone concentration characteristic slightly higher than that of TiO$_2$ is indicated. The energy value of a band gap for photoexciting the tungsten oxide film WO$_3$ and the ferric oxide film Fe$_2$O$_3$ is 2.8 eV and 2.2 eV, respectively, and is small as compared with the energy value (3 eV, 3.2 eV) of the band gap for photoexciting TiO$_2$. Thus, with respect to the wavelength of the ultraviolet light for photoexcitation, although the ultraviolet light of 300 to 400 nm is needed in the case of the TiO$_2$ film, in the case of WO$_3$, the light of 330 to 470 nm is sufficient, and in the case of Fe$_2$O$_3$, the light of 564 nm is sufficient, and even the discharge light of the silent discharge of the oxygen gas itself and the visible light can sufficiently cause photoexcitation, and there is an effect that ozone generation can also be effectively performed.

Figure 20:
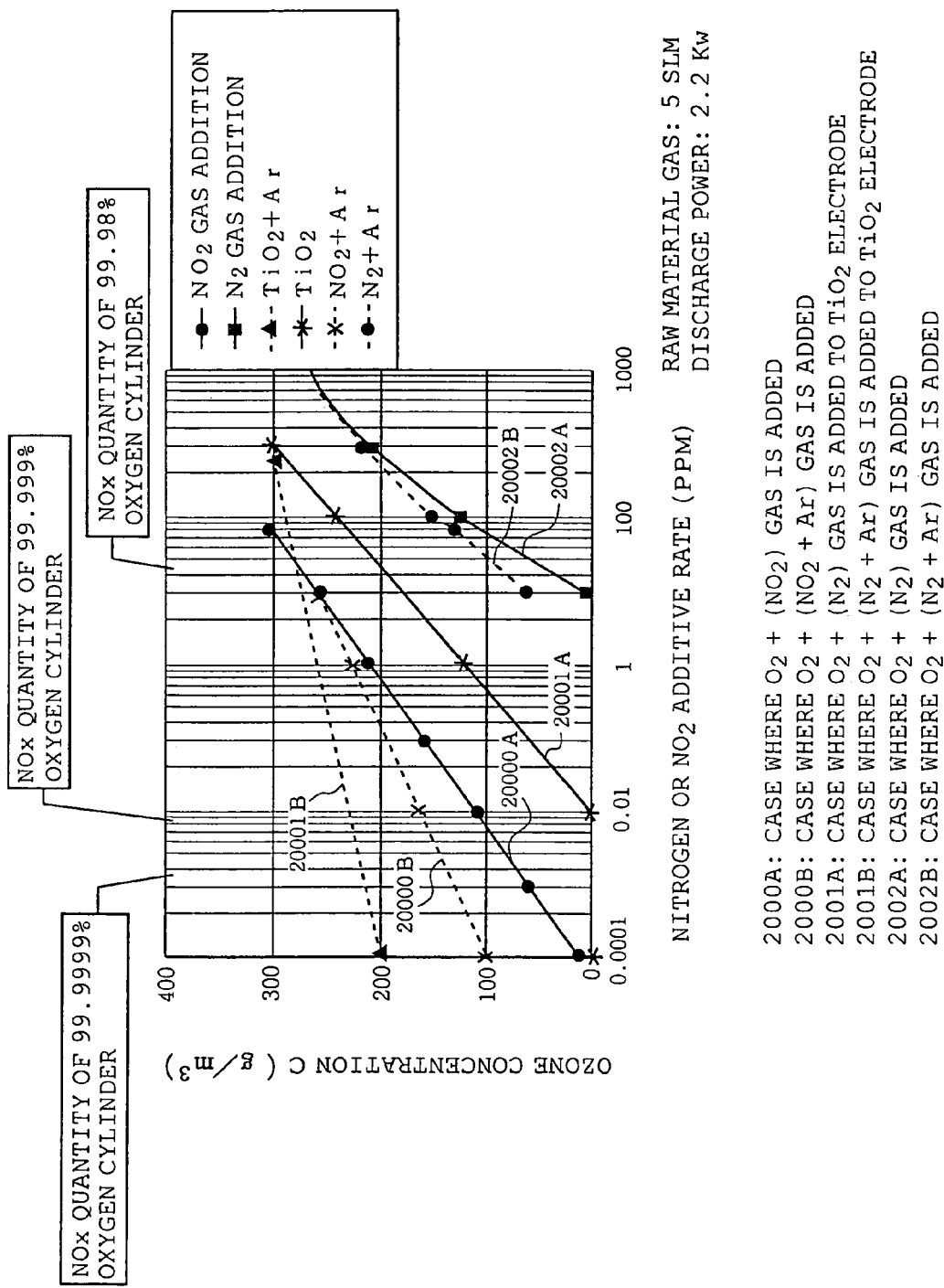
FIG. 20 is a characteristic diagram showing an ozone concentration characteristic with respect to the quantity of nitrogen dioxide or the quantity of nitrogen of this invention.

FIG. 20 shows ozone concentration characteristics with respect to the quantity of nitrogen or nitrogen dioxide contained in a raw material gas.

Systems enabling generation of ozone include three systems: i) a system (characteristic 20002A) in which nitrogen is added to the raw material gas, ii) a system (characteristic 20000A) in which nitrogen dioxide is added to the raw material gas, and iii) a system (characteristic 20001A) in which a discharge part in the generator is formed of a photocatalyst such as WO$_3$, Fe$_2$O$_3$ or TiO$_2$, and in the drawing, ozone concentration characteristics of the respective systems are indicated by solid lines (characteristic 20002A), (characteristic 20000A) and (characteristic 20001A).

Besides, broken lines (characteristic 20002B), (characteristic 20000B) and (characteristic 20001B) indicate ozone concentration characteristics in the case where an argon gas is further added to the raw material gas in the above three systems enabling the ozone generation.

Besides, the drawing shows a rough allowable value of nitrogen (NOx quantity) contained in a cylinder itself in the high purity cylinder such as an oxygen cylinder of a raw material gas. With respect to the illustrated cylinders having respective purities, an experimental data value lower than that has a large error and is a value which can not be evaluated much.

As shown in FIG. 20, in the respective systems, when a specified quantity or more of nitrogen or nitrogen dioxide is added, even if the argon gas is added, the ozone concentration is not raised. That is, the argon gas performs an auxiliary action useful to accelerate generation in the case where the quantity of the nitrogen gas or nitrogen dioxide is small.

Further, in the newest "etching apparatus of an oxide film by ozone" or "ozone water washing of a wafer or the like", a high ozone concentration of 200 g/m$^3$ or more is needed, and with respect to the ozone generation quantity, there is a request for an ozone generator having an ozone capacity of several tens g/h or more on an economic basis in production of the user side, and further, in a semiconductor manufacture apparatus, an apparatus with little reaction poisonous substance such as nitric acid has been needed.

Figure 21:
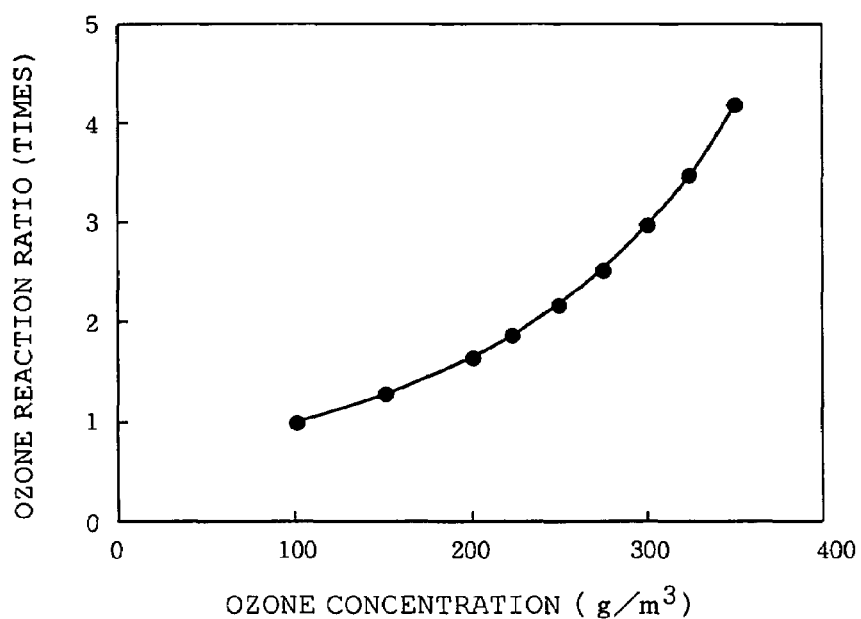
FIG. 21 is a characteristic diagram showing an ozone reaction characteristic with respect to an ozone concentration of this invention.

FIG. 21 shows an ozone reaction ratio characteristic with respect to ozone concentration when the reaction degree at an ozone concentration of 100 g/m$^3$ is made 1 (standard). As shown in FIG. 21, in the processing apparatus using the ozone gas, when the ozone gas with a high concentration of 200 g/m$^3$ or more is supplied, a general reaction speed is increased, and the processing efficiency is greatly increased.

Figure 22:
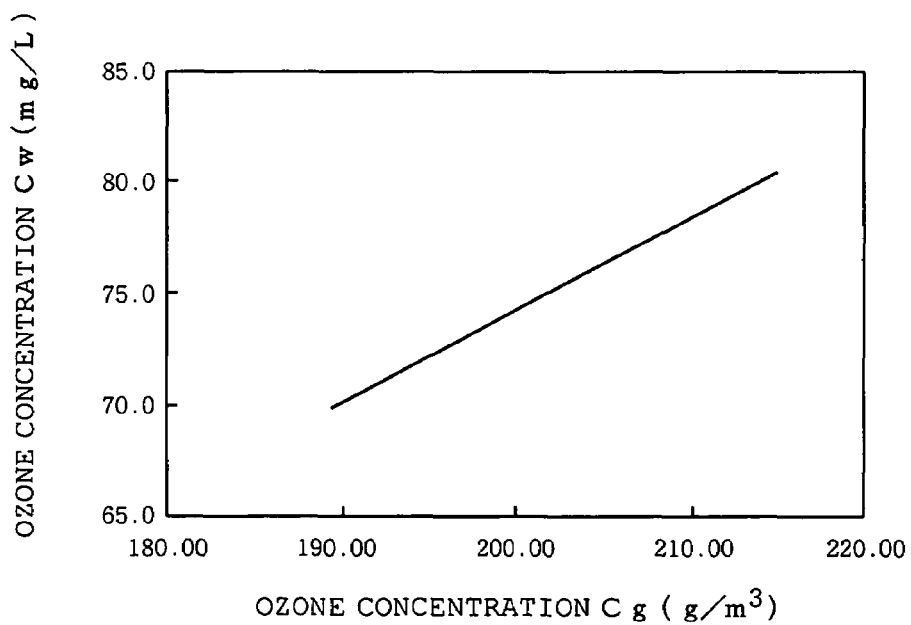
FIG. 22 is a characteristic diagram showing an ozone water concentration with respect to an ozone concentration of this invention.

Besides, FIG. 22 shows an example of a concentration characteristic of ozone concentration and concentration of ozone water in an apparatus for forming the ozone water by causing ozone gas to permeate into pure water. In FIG. 22, in the ozone water production apparatus, the ozone gas with a high concentration of 200 g/m$^3$ or more is needed in order to obtain the ozone water of approximately 70 mg/L or more.

Figure 23:
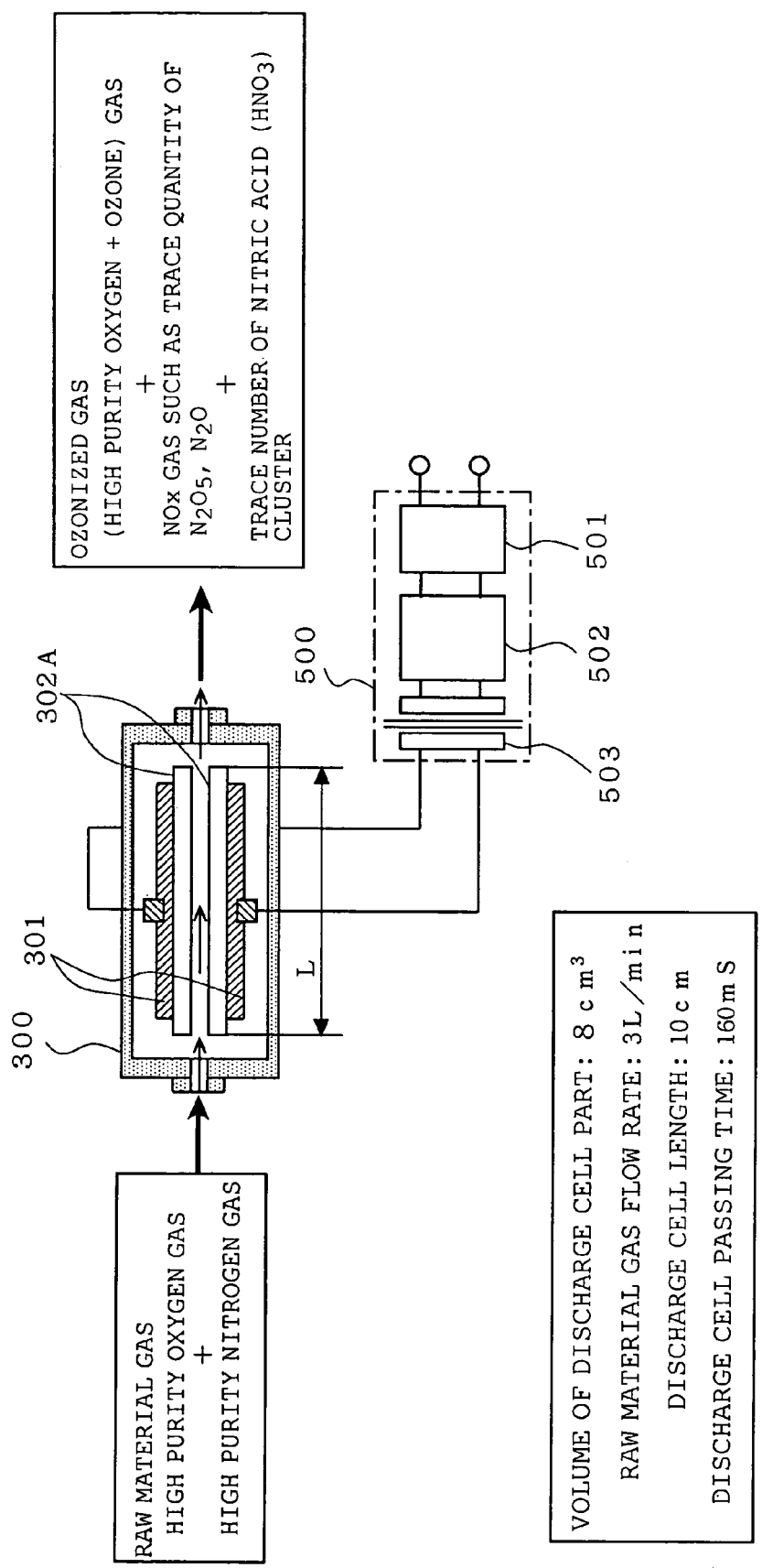
FIG. 23 is a structural view for explaining an ozone generator of this invention.

In the embodiment, an ozone generator 300 shown in FIG. 23 is of a type in which a both-sided electrode can be cooled and is constructed by a gap length of 0.1 mm and a discharge area of about 750 cm$^2$. While discharge power W up to about 2000 W was injected from an ozone power supply, ozone concentration characteristics in the case where nitrogen was added to high purity oxygen were thoroughly examined on experiment.

The ozone concentration characteristics were measured in the case where, as the nitrogen additive rate, 1) only high purity oxygen was used, 2) a noble gas of high purity oxygen was added, 3) nitrogen of 100 ppm was added, 4) nitrogen of 300 ppm was added, 5) nitrogen of 500 ppm was added, 6) nitrogen of 1000 ppm was added, and 7) nitrogen of 10000 ppm was added.

Figure 24:
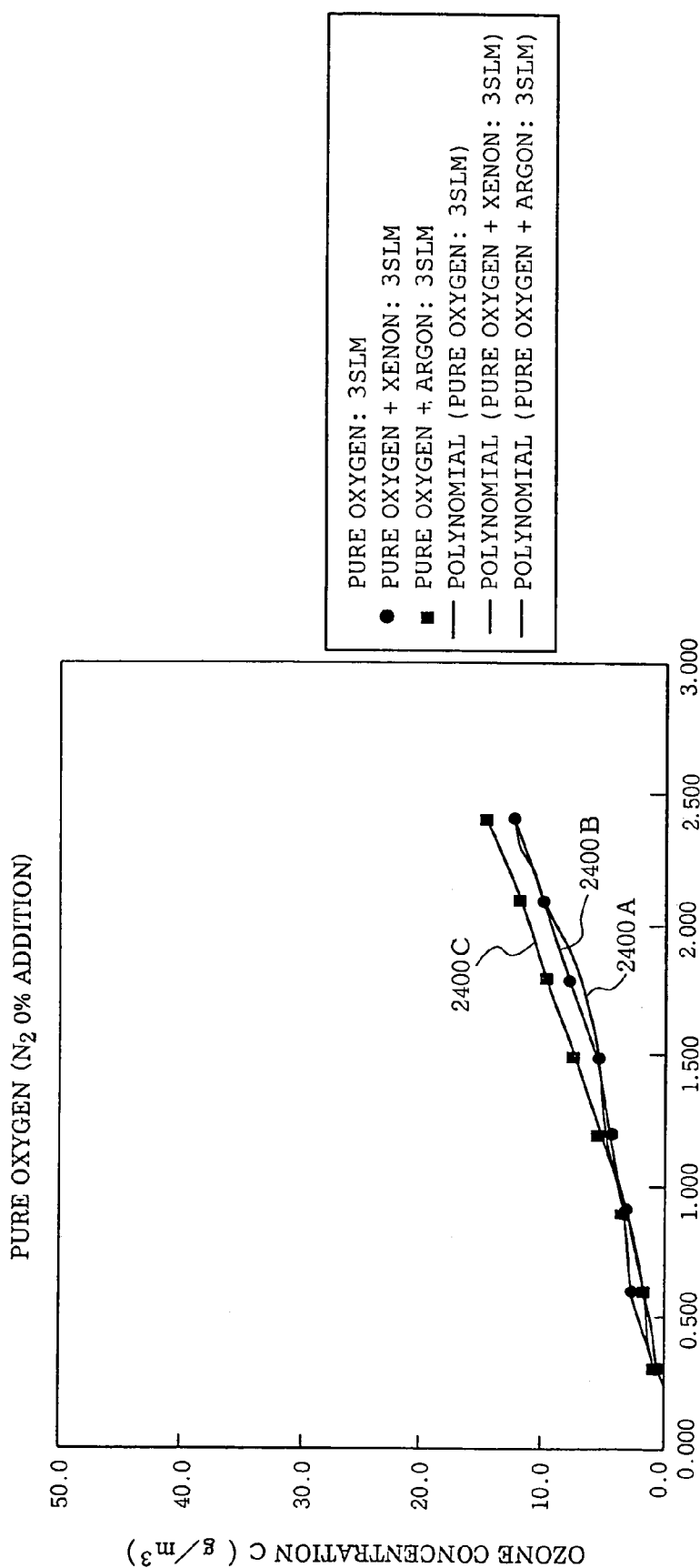
FIG. 24 is a characteristic diagram showing an ozone concentration characteristic for explaining this invention.
Figure 25:
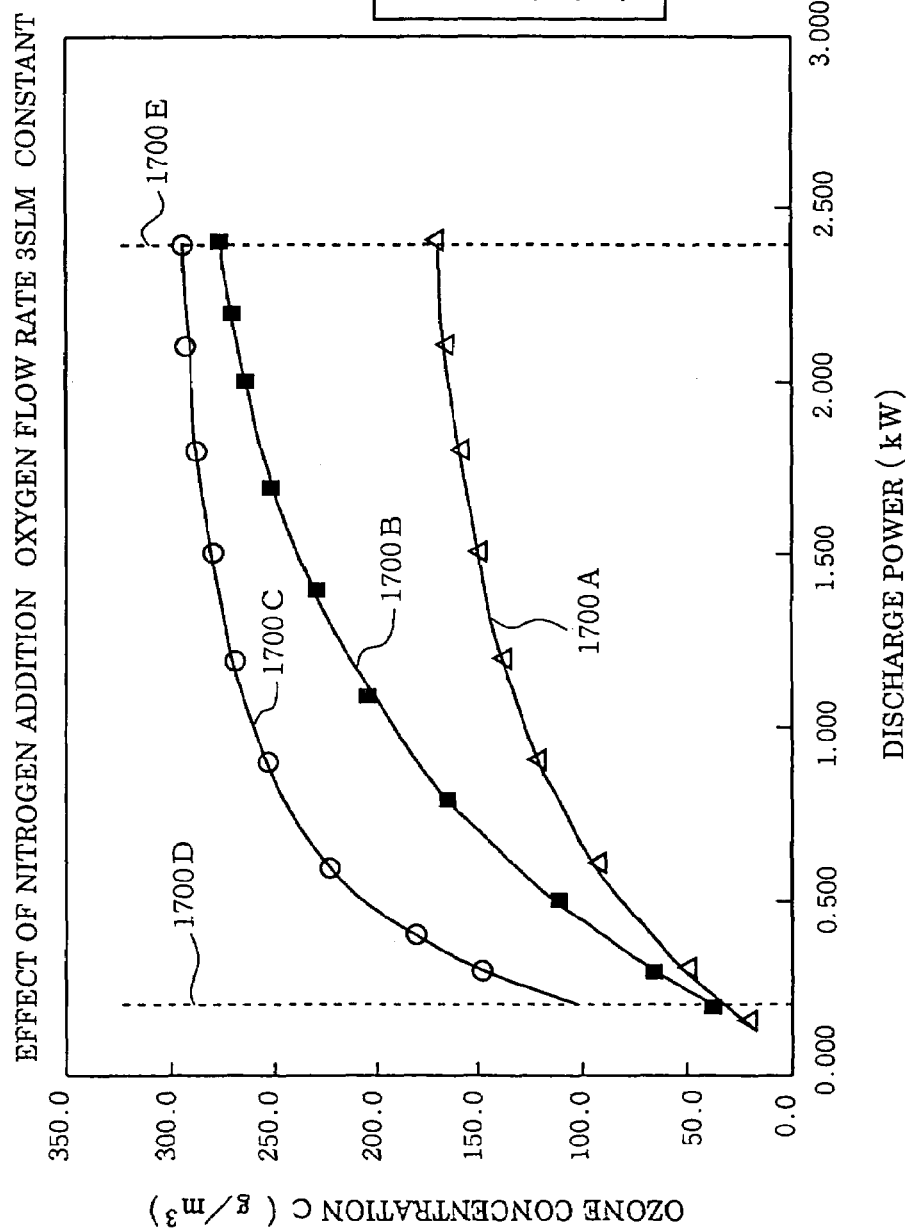
FIG. 25 is a characteristic diagram showing an ozone concentration characteristic for explaining this invention.
Figure 26:
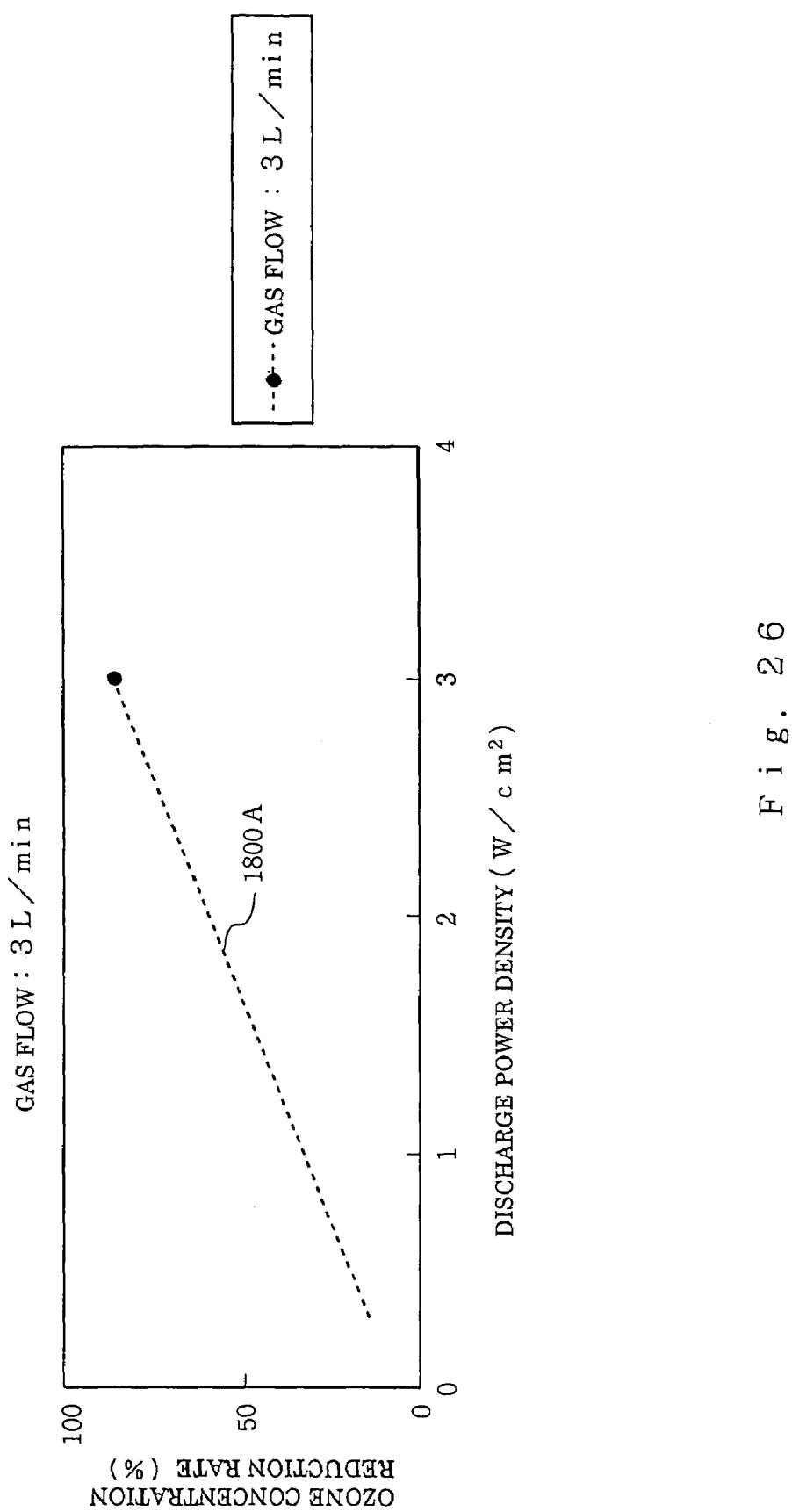
FIG. 26 is a characteristic diagram showing a discharge power density at a nitrogen additive rate of 0.1% and an ozone concentration reduction rate in this invention.

FIGS. 24, 25 and 26 show examples of the results.

Figure 27:
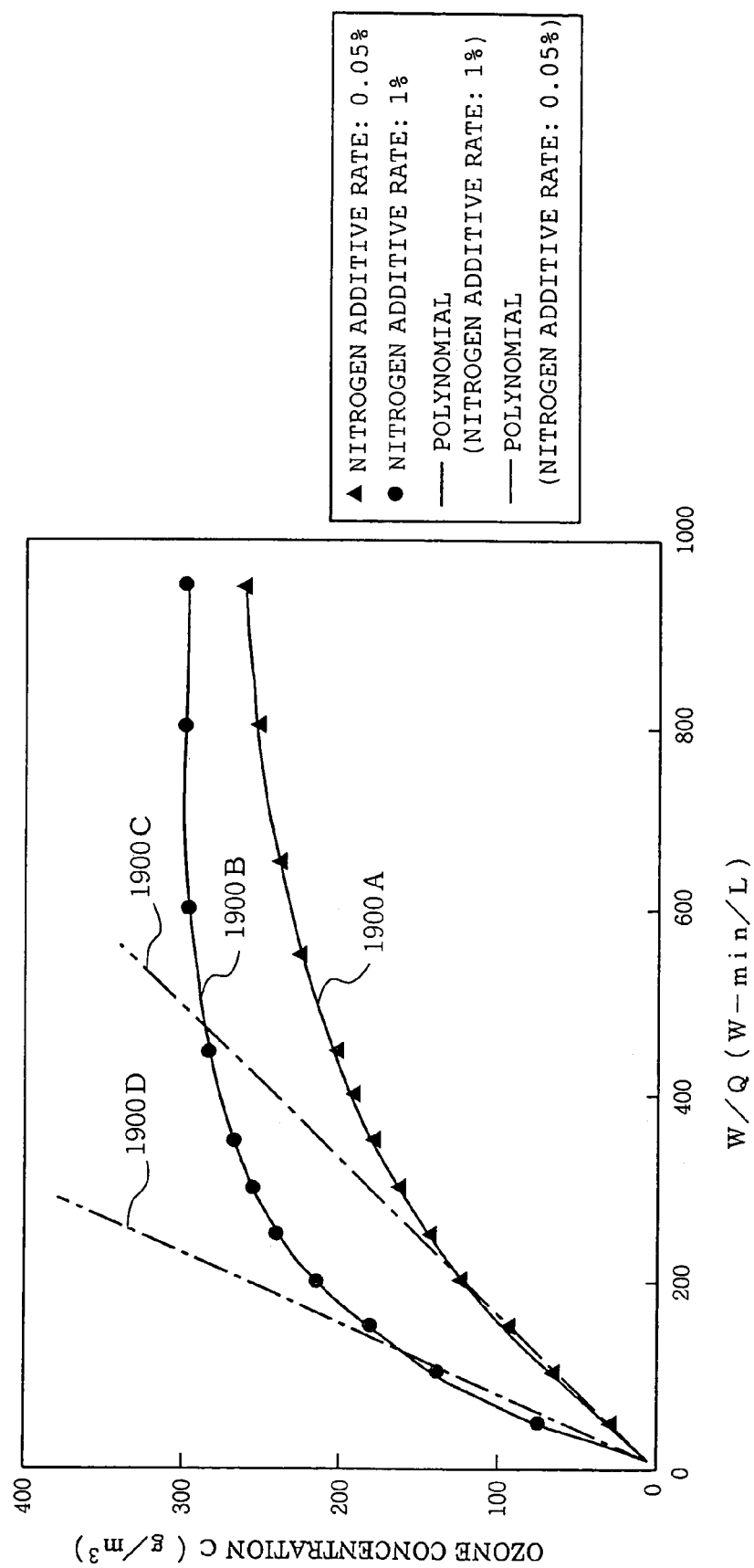
FIG. 27 is a characteristic diagram showing an ozone concentration characteristic with respect to W/Q in this invention.

Besides, FIG. 27 shows characteristics of an injection power W/Q—ozone concentration C with respect to unit gas quantity in a case of nitrogen additive rate of 1% (10000 ppm) and in a case of 0.05% (500 ppm). W(W) denotes discharge injection power, and Q(L/mim) denotes raw material gas flow rate. Tangential lines of these characteristics at low concentration (region where ozone loss can be neglected) are indicated by broken lines.

The inclination of this broken line indicates the ozone generation efficiency η in principle, and indicates the ozone generation weight in the case where electrical energy of 1 J is injected. That is, the unit of the ozone generation efficiency η is (mg/J).

Experimental characteristics concerning the relation between the nitrogen additive rate γ and the ozone generation efficiency η were obtained, and the result is as shown in FIG. 28, and the approximate expression is as follows:

approximate expression η=0.004310 g (γ)+0.033 [mg/J].

From this result, a remarkable result was obtained, that is, when the nitrogen additive rate γ was 0%, the ozone generation rate η was almost 0 mg/J.

FIG. 24 shows the ozone concentration characteristic with respect to the injection power in the case where only high purity oxygen gas is used and the cases where the argon gas and the xenon gas are added.

With respect to the ozone concentration 290 g/m$^3$ at 2000 W obtained in FIG. 25, in FIG. 24, in any raw material gases, only the ozone concentration of 10 g/m$^3$ was obtained, and the separate additions, of the argon gas and the xenon gas had little effect to raise the ozone concentration and the generation quantity. Here, although the cases of the argon gas and the xenon gas are shown as examples, the same result was obtained also for the addition of the noble gas such as helium or neon.

FIG. 25 shows ozone concentration characteristics 1700A, 1700B and 1700C with respect to the discharge power in the case where the nitrogen additive rates are 0.01%, 0.1% and 1%.

Besides, a broken line 1700D indicates a condition of a discharge power density of 0.25 W/cm$^2$ as low power density, and a broken line 1700E indicates a condition of a discharge power density of 3 W/cm$^2$ as high power density.

FIG. 26 shows the reduction ratio of the ozone concentration in a case of nitrogen additive rate of 0.1% with respect to discharge power density in the case where the ozone concentration characteristic of a case of a nitrogen additive rate of 1% is made 100%, and the ozone concentration characteristic of a case of a nitrogen additive rate of 0.01% is made 0% (characteristic 1800A).

From this drawing, in the low power density of 0.25 W/cm$^2$, the ozone concentration is about 13% as compared with the concentration in the case where nitrogen of 1% is added, and at the high power density of 3 W/cm$^2$, the ozone concentration is reduced to about 86% as compared with the concentration in the case where nitrogen of 1% is added.

That is, there is obtained a strain result that even if the nitrogen addition quantity is the same, the cause of the reduction of the ozone concentration is different between the case of the high power density and the case of the low power density.

From this result, the existence quantity of a by-product relating to the nitrogen gas in the discharge part is compared between the case of the high power density and the case of the low power density. Then, it has been understood that at the high power density, the quantity of the nitrogen gas is very low, and the quantity of the oxide compound gas by discharge, such as nitrogen dioxide, is large. On the contrary, it has been ascertained that at the low power density, since the discharge power is small, most of the gas is the nitrogen gas, and the quantity of the oxide compound gas such as nitrogen dioxide is small.

Then, at the low power density, as compared with the case of nitrogen addition of 1%, in the case of nitrogen addition of 0.1%, ozone concentration substantially corresponding to the ratio of the nitrogen addition quantity is merely obtained. At the high power density, the result is such that the ozone concentration does not depend on the nitrogen addition quantity much.

From the above experimental result, it has been understood that two factors exist as the factor contributing to the ozone generation of silent discharge.

That is, it has been found that the first factor is due to the factor of nitrogen itself, and the second factor is due to the quantity of the oxide compound.

With respect to the factor of the nitrogen itself, from further examination of discharge excited light, it has been understood that the nitrogen gas emits ultraviolet light of approximately 300 nm.

Besides, from the examination of light dissociation of the oxygen gas molecule and nitrogen dioxide as the oxide compound gas, it has been understood that the nitrogen dioxide can be dissociated by ultraviolet rays of 300 nm, and the oxygen atom can be generated by thermal catalytic reaction action, however, the oxygen molecule can not be dissociated if vacuum ultraviolet light of about 130 to 245 nm is not used.

Further, it has been understood that in the oxide compound gas such as nitrogen dioxide, the energy band from the valence band to the conduction band in the molecule is larger than the energy band of metal, and when light of ultraviolet rays of about 300 nm is impinged on this energy band, nitrogen dioxide performs light absorption, and the nitrogen dioxide itself is excited, and when the excited nitrogen dioxide is returned to the ground state, and when the oxygen gas ($O_2$ molecule) exists in the atmosphere, high energy equivalent to ultraviolet light for dissociating the oxygen molecule is released, and there is an effect to dissociate the oxygen molecule (that is, photocataltic action).

From the above series of result s, it has been understood that the factor contributing to the ozone generation by nitrogen oxide is light dissociation of the nitrogen oxide gas, and accelerating action of dissociation of the oxygen gas ($O_2$ molecule) itself by the photocataltic action of nitrogen oxide, and the oxygen atom is generated In the following, the examination result of ozone generation will be described in more detail.

In the addition of only the high purity oxygen, and the separate addition of the noble gas or the like, the ozone generation efficiency η is approximately 0 mg/J, which basically overturns a conventional ozone generation mechanism which is expressed by following reaction equations R1 and R2.

R1: $e + O_2 \Rightarrow 2O + e$ (dissociation of oxygen)

R2: $O + O_2 + M \Rightarrow O_3 + M$ (ozone generation based on triple collision of oxygen atom and oxygen material)

From the conclusion, the relation between nitrogen and ozone has been examined in detail, and the following inference has been obtained.

The dew point of the ozone generator i s about −70 to −60, and the concentration of existing moisture contained in the raw material gas is from 3 ppm to 10 ppm or more.

The wavelength of absorption light for dissociating the oxygen molecule has a continuous spectrum of ultraviolet rays of from 130 to 245 nm, and the excited light of the nitrogen gas is ultraviolet light of 300 to 400 nm, and can not directly optically dissociate the oxygen molecule.

With respect to the mechanism for generating the ozone gas through the nitrogen additive rate, the only possibility of the excited light of the nitrogen gas is ultraviolet light of 300 to 400 nm.

Thus, a nitrogen compound capable of dissociating the ozone atom by ultraviolet light of 300 to 400 nm was examined. As a result, it has been confirmed that there are (1) a mechanism of light emission of ultraviolet light by discharge, and electrolytic dissociation of water vapor $H_2O$ and the nitrogen molecule, and (2) an ozone generation mechanism by $NO_2$. Besides, there are (3) a generation mechanism of nitric acid by $NO_2$ to suppress ozone generation, and (4) a mechanism of ozone decomposition of the generated ozone, and the four mechanisms occur in the silent discharge space of the ozone generator, and the concentration of ozone which can be extracted is determined.

(1) Light emission of ultraviolet+light by discharge and electrolytic dissociation of water vapor $H_2O$ and nitrogen molecule $N_2 + e \Rightarrow N_2^* + e \Rightarrow N_2 + h\nu$ (310, 316, 337, 358 nm)

$N_2^*$: excitation of nitrogen ultraviolet light by nitrogen gas $H_2O + e \Rightarrow H + OH + e$ (electrolytic dissociation of water vapor)

$N_2 + e \Rightarrow 2N + e$ (electrolytic dissociation of nitrogen molecule)

(2-1) Generation mechanism of ozone by thermal catalytic chemical reaction of $NO_2$ R6: $NO_2 + h\nu$ (295 to 400 nm) $\Rightarrow NO + O(^3P)$ R71: $H + O_2 + M \Rightarrow HO_2 + M$ R81: $HO_2 + NO \Rightarrow OH + NO_2$ R2: $O(^3P) + O_2 + M \Rightarrow O_3 + M$ The oxygen atom $O(^3P)$ is formed (reaction of R6) by the nitrogen dioxide $NO_2$ and ultraviolet light of approximately 300 nm by excitation of nitrogen, and ozone is generated (reaction of R2) by triple collision of the generated oxygen atom $O(^3P)$ and the oxygen molecule $O_2$. The nitrogen monoxide NO generated from the reaction result of R6 reacts with an $HO_2$ radical generated at the reaction of R71 and the nitrogen dioxide $NO_2$ is regenerated (reaction of R81).

That is, during the time when the raw material gas passes through the silent discharge space, the nitrogen dioxide $NO_2$ repeats the reaction cycle of R6→R71→R81→R6 and is regenerated.

Besides, the oxygen atom $O(^3P)$ simultaneously generated during the time when the raw material gas passes through the silent discharge space is subjected to the triple collision (reaction of R2) to the oxygen molecule and the ozone gas is generated.

(2-2) Generation mechanism of ozone by photocataltic reaction of $NO_2$

H1: $NO_2 + h\nu$ (295 to 400 nm) $\Rightarrow NO_2^*$

H2: $NO_2^* + O_2 \Rightarrow 2O(^3P) + NO_2$

R2: $2O(^3P) + 2O_2 + M \Rightarrow 2O_3 + M$

The nitrogen dioxide $NO_2$ becomes excited state $NO_2^*$ (reaction of H1) by nitrogen dioxide $NO_2$ and ultraviolet light of approximately 300 nm by discharge light of argon or the like or discharge light of nitrogen. The excited $NO_2^*$ gives energy equivalent to dissociation energy of the oxygen molecule to the oxygen molecule to dissociate it into the oxygen atom $O(^3P)$, and the nitrogen dioxide itself is returned to $NO_2$ in the ground state.

The ozone is generated (reaction of R2) by the triple collision of the generated oxygen atom $O(^3P)$ and the oxygen molecule $O_2$. $NO_2$ in the ground state again becomes the excited state $NO_2^*$ by the ultraviolet light of approximately 300 nm by the discharge light.

That is, during the time when the raw material gas passes through the silent discharge space, the nitrogen dioxide $NO_2$ repeats the reaction cycle of H1→H2→H1 and is regenerated.

Besides, the oxygen atom $O(^3P)$ simultaneously generated during the time when the raw material gas passes through the silent discharge space is subjected to the triple collision (reaction of R2) to the oxygen molecule and the ozone gas is generated.

(3) Generation mechanism of nitric acid by $NO_2$

R9: $OH+NO_2+M \Rightarrow HNO_3+M$

The nitrogen dioxide $NO_2$ generates ozone, and at the same time, nitric acid $HNO_3$ is also generated (reaction of R9), the generation of the oxygen atom is suppressed, and the generation efficiency η of ozone is lowered.

(4) Mechanism of ozone decomposition

R3: $e+O_3 \Rightarrow O+O_2+e$ (electron collision decomposition)

R4: $O_3+heat\ T \Rightarrow O+O_2$ (heat decomposition)

R5: $O_3+N \Rightarrow O_2+N1$ (decomposition of ozone by impurity)

The ozone generated by the reaction of R2 is decomposed (reaction of R3) by electron collision in the silent discharge space, is decomposed by heat (reaction of R4), and is decomposed by an impurity such as NOx (reaction of R5).

Thus, the ozone which can be extracted from the ozone generator becomes as follows, and like the ozone concentration characteristic of FIG. 27, as compared with the ozone generation efficiency η characteristic (broken line), the saturated characteristic occurs.

$$\text{extractable ozone concentration} = (\text{ozone gene ration quantity}) -$$
$$(\text{ozone decomposition quantity})$$
$$= (R2 - R9) - (R3 + R4 + R5).$$

Although the reaction of R3 is increased linearly with respect to the injection power of the silent discharge, since the reactions of R9, R4 and R5 are increased in a lamp function by the increase of injection power, they prevent high concentration ozone gas from being extracted.

In order to raise the extractable ozone concentration, as means for suppressing the reactions of R3 and R4, it has been already proposed that the extractable ozone concentration is raised by causing the discharge gap length in the generator to have a short gap (0.1 mm or less), or by cooling the electrode surface.

Besides, in order to raise the extractable ozone concentration, with respect to means for suppressing the reaction of R5, it has been already clear to use a high purity raw material gas with an excellent dew point (−50° C. or lower).

However, means for increasing the ozone generation quantity in order to raise the extractable ozone concentration has not been considered at all.

The reason is that it has been interpreted that the ozone is generated by dissociating the oxygen molecule through high energy electron collision of discharge, and by performing the triple collision of the ozone atom and the ozone molecule, and therefore, it has been considered that the high energy electron quantity is almost constant when the discharge state is determined, and the ozone generation quantity can not be changed.

Besides, it has been regarded that the generated ozone is excited by the silent discharge and the ozone molecule $O_3$ becomes $O_3^*$, the excited ozone molecule $O_3^*$ is returned to the oxygen molecule by electron collision, and time-varying concentration reduction of the extractable ozone concentration occurs.

It has been considered that the nitrogen gas is effective as means for suppressing the time-varying concentration reduction.

However, from the experiments, it has been newly found experimentally that when the high purity oxygen gas is injected in the state where the ozone generator is sufficiently made clean and an impurity gas other than the high purity oxygen can be neglected, the reduction of the ozone concentration is not time-varying concentration reduction, but essential concentration reduction due to pure oxygen.

While the presently preferred embodiments of the present invention have been shown and described. It is to be understood that these disclosures are for the purpose of illustration and that various changes and modifications may be made without departing from scope of the invention as set forth in the appended claims.

What is claimed is:

1. An ozone generator comprising:
   a first electrode;
   a second electrode facing the first electrode and defining a discharge area;
   a first raw material gas supply unit for supplying oxygen as a first raw material gas;
   a photocatalytic material on a dielectric substrate located in the discharge area or on the first electrode and absorbing light in a specified wavelength range, or a material transformed into a photocatalyst by a discharge;
   a second raw material gas supply unit for supplying a second raw material gas as an oxide compound gas or generating an oxide compound gas in response to the discharge; and
   a third raw material gas supply unit for supplying a third raw material gas which is excited by the discharge and generates excited light to excite the photocatalytic material and the oxide compound gas to generate an oxygen atom, wherein an AC voltage is applied between the first electrode and the second electrode from a power supply to supply discharge power to the discharge area, quantities of the raw material gases are supplied by the first, second, and third raw material gas supply units to a space where the discharge is generated in the discharge area, and ozone is generated.

2. The ozone generator according to claim 1, wherein the photocatalytic material is one selected from a group consisting of $WO_3$, $CrO_2$, $Fe_2O_3$, $TiO_2$, a metal-semiconductor structure, and a ferroelectric material.

3. The ozone generator according to claim 1, wherein the photocatalytic material includes a plurality of different photocatalytic materials.

4. The ozone generator according to claim 1, wherein the second raw material gas is selected from the group consisting of nitrogen dioxide, nitrogen monoxide, nitrogen, carbon dioxide, and carbon monoxide, and the second raw material gas is contained in the oxygen in a concentration from 0.2 ppb to several hundreds of ppm.

5. The ozone generator according to claim 1, wherein the third raw material gas is selected from the group consisting of a noble gas, nitrogen monoxide, nitrogen dioxide, and carbon dioxide, and the third raw material gas is contained in the oxygen in a concentration of from several hundred ppm to 50000 ppm.

6. The ozone generator according to claim 1, including a cylinder in which the second raw material gas is added to the third raw material gas, and the second raw material gas and the third raw material gas are added to the first raw material gas.

7. The ozone generator according to claim 1, including a cylinder in which the second raw material gas and the third raw material gas are added to the first raw material gas.

* * * * *